United States Patent
Inokawa et al.

(10) Patent No.: US 7,701,445 B2
(45) Date of Patent: Apr. 20, 2010

(54) INPUT DEVICE AND PROCESS FOR MANUFACTURING THE SAME, PORTABLE ELECTRONIC APPARATUS COMPRISING INPUT DEVICE

(75) Inventors: Hiroyuki Inokawa, Kanagawa (JP); Kimiyasu Satoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 1315 days.

(21) Appl. No.: 10/528,173

(22) PCT Filed: Sep. 17, 2003

(86) PCT No.: PCT/JP03/11818

§ 371 (c)(1),
(2), (4) Date: Mar. 17, 2005

(87) PCT Pub. No.: WO2004/040430

PCT Pub. Date: May 13, 2004

(65) Prior Publication Data

US 2005/0253643 A1 Nov. 17, 2005

(30) Foreign Application Priority Data

Oct. 30, 2002 (JP) .............................. 2002-315308

(51) Int. Cl.
*G06F 3/033* (2006.01)
(52) U.S. Cl. .................... 345/173; 345/156; 715/701
(58) Field of Classification Search ................ 345/173, 345/156; 715/701
See application file for complete search history.

(56) References Cited

U.S. PATENT DOCUMENTS

| | | | |
|---|---|---|---|
| 4,383,363 A * | 5/1983 | Hayakawa et al. ............ 29/847 |
| 5,028,743 A * | 7/1991 | Kawakami et al. ........... 174/264 |
| 5,202,135 A * | 4/1993 | Yawn ........................... 425/527 |
| 5,220,135 A * | 6/1993 | Kawakami et al. ........... 174/264 |
| 5,243,142 A * | 9/1993 | Ishikawa et al. ............. 174/262 |
| 5,289,312 A | 2/1994 | Hashimoto et al. | |
| 5,462,454 A * | 10/1995 | Kramer et al. ............... 439/571 |
| 5,808,522 A * | 9/1998 | Futakuchi et al. ............ 333/187 |
| 6,013,876 A * | 1/2000 | Caporizzo .................... 174/262 |
| 6,049,158 A * | 4/2000 | Takeuchi et al. ............. 310/328 |

(Continued)

FOREIGN PATENT DOCUMENTS

JP 07-213997 8/1995

(Continued)

*Primary Examiner*—Bipin Shalwala
*Assistant Examiner*—Afroza Y Chowdhury
(74) *Attorney, Agent, or Firm*—Oblon, Spivak, McClelland, Maier & Neustadt, L.L.P.

(57) ABSTRACT

A pair of through-holes 41a and 41b having the same shape are formed and aligned in a flexible board 4 on which a wiring pattern 42 is formed. A piezoelectric actuator 3 made of a piezoelectric bi-morph device is inserted into the first through-hole 41a and then into the second through-hole 41b from the opposite surface side. As a result, both the ends in the longitudinal direction of the piezoelectric actuator 3 contact the same surface of the flexible board 4. The flexible board 4 is disposed so that it contacts a touch sensor portion except for a part of the flexible board 4. Thus, a high performance force sense feedback function caused by the panel that deforms corresponding to an input operation can be accomplished at low cost.

17 Claims, 13 Drawing Sheets

U.S. PATENT DOCUMENTS

| | | | |
|---|---|---|---|
| 6,147,584 A * | 11/2000 | Shin'el | 336/223 |
| 6,577,370 B1 * | 6/2003 | Sato | 349/149 |
| 6,619,785 B1 * | 9/2003 | Sato | 347/50 |
| 6,668,437 B1 * | 12/2003 | Maruyama et al. | 29/25.35 |
| 6,891,314 B2 * | 5/2005 | Sato et al. | 310/328 |
| 2002/0149296 A1 * | 10/2002 | Fujii et al. | 310/328 |
| 2003/0146673 A1 * | 8/2003 | Toda et al. | 310/313 D |
| 2004/0000877 A1 * | 1/2004 | Morton et al. | 315/169.3 |

FOREIGN PATENT DOCUMENTS

| | | |
|---|---|---|
| JP | 9-161602 | 6/1997 |
| JP | 3085481 | 7/2000 |
| JP | 2001-202195 | 7/2001 |
| JP | 2001-339136 | 12/2001 |

\* cited by examiner

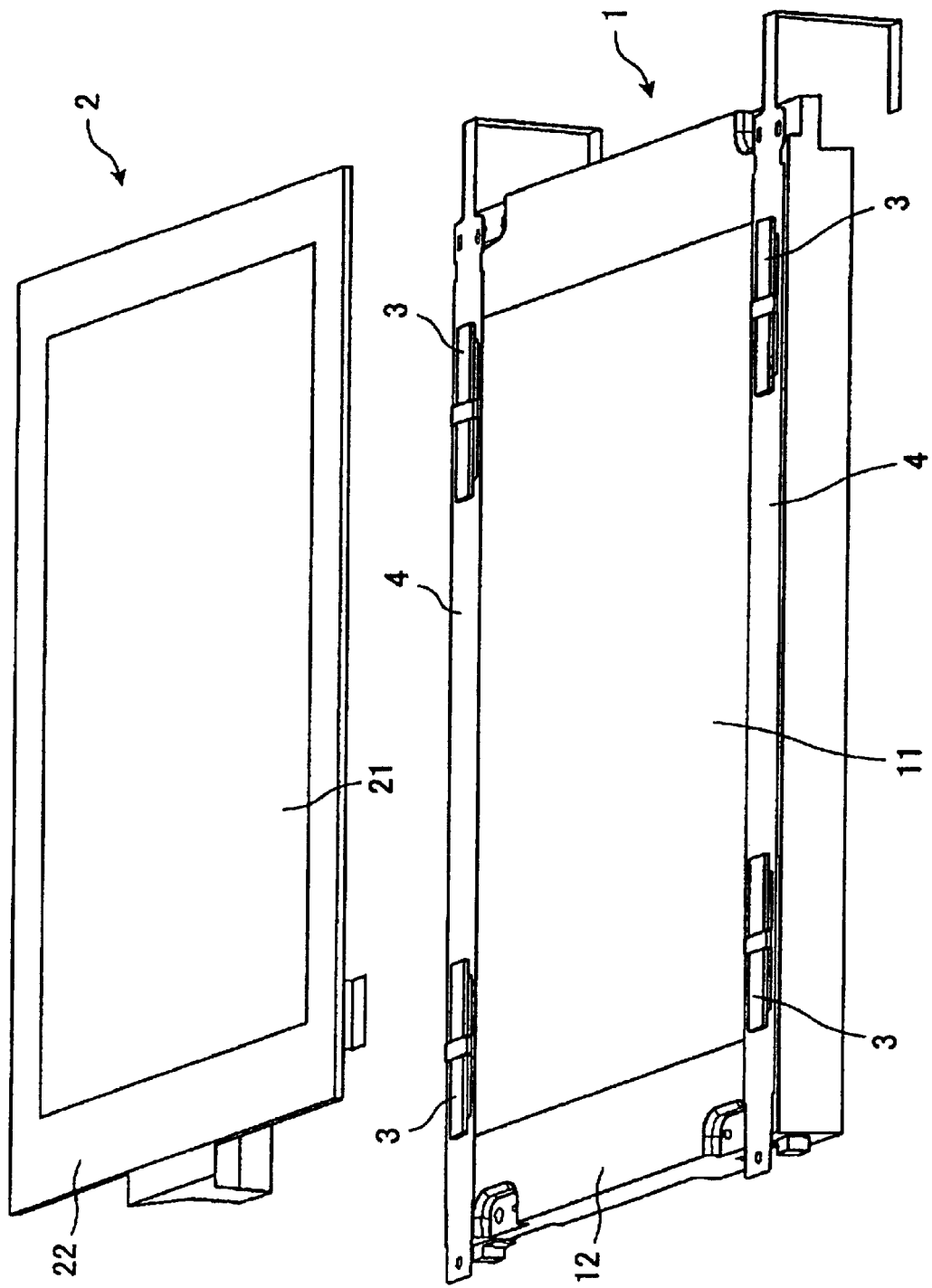

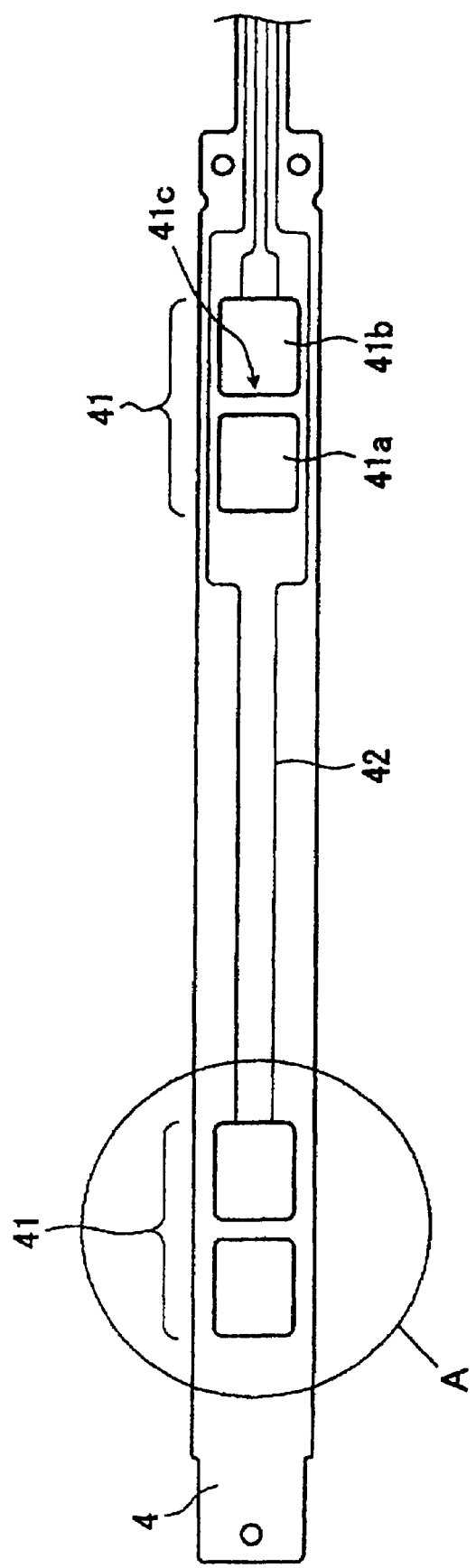

INPUT DEVICE AND PROCESS FOR MANUFACTURING THE SAME, PORTABLE ELECTRONIC APPARATUS COMPRISING INPUT DEVICE

TECHNICAL FIELD

The present invention relates to an input apparatus for detecting whether a pressing operation or a touching operation has been performed on the front surface of a panel and inputting data corresponding to the detected result, a method for producing the input apparatus, and a portable electronic apparatus having the input apparatus, in particular, to an input apparatus having a function for moving a panel surface and feeding back a sense force, a method for producing the input apparatus, and a portable electronic apparatus having the input apparatus.

This application is based upon and claims the benefit of priority from the prior Japanese Patent Application No. 2002-360608, filed on Oct. 30, 2002, the entire contents of which are incorporated herein by reference.

BACKGROUND ART

In recent years, input apparatuses called touch panels have been used for information processing apparatuses such as automatic teller machines in financial institution, ticketing machines in railroad stations, PDAs (Personal Digital Assistants), and so forth. The touch panel type input apparatus correlates icons and so forth displayed on a display such as an LCD (Liquid Crystal Display) with the coordinate system on the display panel and displays the position that the user has touched with his or her finger or a pointing device such as a pen so as to accomplish a GUI (Graphical User Interface) function.

In the conventional touch panel type input apparatus, when the user operates it and inputs data thereto, for example an icon that he or she has pressed varies in its appearance or an operation sound occurs so as to inform him or her that the input operation has been accepted. In contrast, in a recent touch panel, when the user presses an icon or the like, the height of the panel varies, causing a force sense to be fed back to his or her finger or a pointing device. As a result, since the user can feel as if he or she touched (clicked) a switch button, his or her operational feeling improves.

For example, Japanese Patent Application Laid-Open Publication No. 2002-259059 (laid open on Sep. 13, 2002) discloses a resistor film type touch panel having a structure of which a plurality of electrode sheets on which transparent electrodes are formed are layered in such a manner that they are spaced apart by a predetermined length and their electrodes are oppositely aligned. In particular, paragraphs [0037] to [0042] and FIG. 6 describe a touch panel having a multilayer structure, three or more electrode sheets, and actuators such as bobbin coils disposed between a casing that fixes the touch panel and a casing that fixes the display side so as to feed back a force sense to the touch panel.

Piezoelectric actuators that use piezoelectric bi-morph devices are thought to be suitable to accomplish such a force sense feedback function. The piezoelectric actuator has a structure of which a plurality of film-shaped piezoelectric members are adhered through an electrode sheet. The piezoelectric actuator has a characteristic of which when a voltage is applied between both surfaces of the piezoelectric actuator, it curves. Thus, when the actuators are disposed between the casing of the panel side on which touch sensors that detect a touching operation or a pressing operation and the casing of the display side, the panel surface can be moved upward and downward.

Next, with reference to FIG. 13 and FIG. 14, an example of the structure of the conventional touch panel type input apparatus having the force sense feedback function will be described.

FIG. 13 is a perspective view showing an example of the structure of the conventional touch panel type input apparatus that has the force sense feedback function.

As shown in FIG. 13, the conventional input apparatus has a touch sensor portion 102 that covers the display surface of for example a liquid crystal display portion 101. Piezoelectric actuators 103 are disposed between the touch sensor portion 102 and the liquid crystal display portion 101. In the example shown in the drawing, four piezoelectric actuators 103 are diagonally disposed on the upper surface of the liquid crystal display portion 101. In such a structure, the same drive voltage is applied to the piezoelectric actuators 103 so that the entire touch sensor portion 102 is moved upward and downward. Although the piezoelectric actuators 103 are actually disposed between a metal frame of the liquid crystal display portion 101 and a metal frame of the touch sensor portion 102, these metal frames are disposed outside the display area of the liquid crystal display portion 101 and the touch sensor portion 102 and the metal frames are omitted in the drawing.

FIG. 14 is a sectional view showing the mounting structure of the conventional piezoelectric actuator 103.

FIG. 14 shows a cross section viewed from arrow E of FIG. 13. When a drive voltage is applied to the piezoelectric actuator 103, it curves and deforms upward and downward. When the center portion and both the end portions contact and press the touch sensor portion 102 or the liquid crystal display portion 101, the force sense feedback function is accomplished.

However, it is not desired that the piezoelectric actuator 103 directly contract the touch sensor portion 102 and the liquid crystal display portion 101. Conventionally, a plurality of spacers having a predetermined thickness are disposed at a plurality of positions on the upper surface and the lower surface of the piezoelectric actuator 103. In the example shown in FIG. 14, two spacers 104a and 104b are disposed at nearly end portions of the lower surface of the piezoelectric actuator 103 and one spacer 104c at the center portion of the upper surface thereof so that these spacers touch the liquid crystal display portion 101 and the touch sensor portion 102. In this structure, even if the piezoelectric actuator 103 deforms downward, the center portion of the lower surface of the piezoelectric actuator 103 and both the end portions of the upper surface thereof can be prevented from directly contacting the liquid crystal display portion 101.

However, when the piezoelectric actuator is mounted with one upper spacer and two lower spacers, several problems will arise.

The first problem is the accuracy of the thickness of spacers. When the spacers are too thick, since they deform by themselves, force that presses the touch sensor portion is transferred to the piezoelectric actuator. Thus, since the piezoelectric actuator is damaged, the thickness of the spacers cannot be unnecessarily increased. In other words, the spacers need to have a height (for example, 100 μm) so that corresponding to the amount of deformation of the center portion of the piezoelectric actuator, the spacers do not deform against the pressure from the touch sensor portion.

Thus, as spacers, a thin sheet material is used. These spacers are adhered at predetermined positions of the piezoelectric actuator. When a double-sided adhesive tape is used to adhere the spacers, the working efficiency is relatively improved. However, since the double-sided adhesive tape deforms in the thickness direction to some extent, it is difficult to accurately maintain the thickness of the spacers and the double-sided adhesive tape. Instead, when an adhesive agent is used to adhere the spacers to the piezoelectric actuator, the adhering work takes a time and the productivity deteriorates.

When the piezoelectric actuators are wired, the following problem will reside. Normally, the piezoelectric actuators are wired with lead wires. However, lead wires that can be used are very thin. In addition, since lead wires are connected to moving portions, the lead wires tend to break. In addition, lead wires should be carefully routed in a limited space. When lead wires are not fixed for moving portions, they may slip to the display area of the display portion. In addition, since a plurality of piezoelectric actuators are disposed, a plurality of types of piezoelectric actuators that have lead wires of different lengths should be provided corresponding to routing, distance to drivers, and so forth. Thus, the productive efficiency is low.

In addition, when the piezoelectric actuators are directly mounted on the metal frames of the liquid crystal display portion and so forth through the spacers with the double-sided adhesive tape, not only cannot the accuracy of the thickness be maintained, but it becomes difficult to replace the piezoelectric actuators with other ones as a problem with respect to maintenance. Maintenance frames made of plastics or the like may be used to hold the piezoelectric actuators. However, when members such as frames are disposed between the touch sensor portion and the liquid crystal display portion, the efficiency of which the deformation of the piezoelectric actuators is transferred to the touch sensor portion deteriorates. In addition, since new parts are used, the production cost rises. Moreover, the difficulty of the mounting work cannot be lightened.

DISCLOSURE OF THE INVENTION

An object of the present invention is to provide an input apparatus that accomplishes at low cost a force sense feedback function for causing a panel to deform corresponding to an input operation.

Another object of the present invention is to provide a method for producing an input apparatus that accomplishes at low cost a force sense feedback function for causing a panel to deform corresponding to an input operation.

The present invention provides an input apparatus for detecting that the front surface of a panel is pressed or touched and inputting data corresponding to the detected result. The input apparatus comprises a flexible wiring board on which a pattern of predetermined electrodes is formed and in which a pair of through-holes are aligned and formed, and a piezoelectric actuator made of a piezoelectric bi-morph device, the piezoelectric actuator being configured to bridge the pair of the through-holes in the flexible wiring board, a part of the flexible wiring board being formed between the pair of the through-holes and positioned on the upper surface of the piezoelectric actuator. The piezoelectric actuator is configured to contact the panel except for the part of the flexible wiring board.

In the input apparatus, a piezoelectric actuator bridges a pair of through-holes aligned in a flexible wiring board. A part between the pair of the through-holes of the flexible wiring board is position on the upper surface of the piezoelectric actuator. The flexible wiring board is mounted so that for example the center portion or both end portions of the piezoelectric actuator contact the panel except for the part formed between the pair of the through-holes. In the structure, when a voltage is applied to the piezoelectric actuator, the panel deforms in the vertical direction of the front surface. As a result, a force sense is fed back to the user who has performed an input operation. Wiring terminals formed at end portions of the piezoelectric actuator and predetermined electrodes formed on the flexible wiring board can be electrically connected.

In addition, the present invention provides a portable electronic apparatus that has the foregoing input apparatus.

In the input apparatus according to the present invention, a piezoelectric actuator contacts the panel except for a part of a flexible wiring board. Since the thickness of the flexible wiring board can be controlled with relatively high accuracy, the accuracy of the mounting position in the thickness direction of the piezoelectric actuator is improved. In addition, the drive force of the piezoelectric actuator is effectively transferred to a spring or the like. Moreover, the piezoelectric actuator is mounted to a pair of through-holes formed in the flexible wiring board. The piezoelectric actuator is mounted so that it contacts the panel except for a part of the flexible wiring board. Thus, the mounting work of the piezoelectric actuator can be effectively performed. When wiring terminals formed at end portions of the piezoelectric actuator and electrodes formed on the flexible wiring board are electrically connected, routing of cables can be easily performed. Thus, according to the present invention, the panel of the input apparatus has a high performance force sense feedback function. The input apparatus can be produced at low cost.

In addition, the present invention provides a method for producing an input apparatus for detecting that the front surface of a panel is pressed or touched and inputting data corresponding to the detected result. The method for producing the input apparatus comprises the steps of forming a pair of through-holes aligned in a flexible wiring board on which a pattern of predetermined electrodes is formed, inserting a piezoelectric actuator made of a piezoelectric bi-morph device into one of the pair of the through-holes and then the other from the opposite surface side so that both the ends in the longitudinal direction of the piezoelectric actuator contact the same surface of the piezoelectric actuator, and mounting the flexible wiring board on the panel so that the piezoelectric actuator contacts the panel except for a part formed between the pair of the through-holes in the flexible wiring board.

According to the method for producing the input apparatus, a pair of through-holes are formed in a flexible wiring board. A piezoelectric actuator is mounted on the flexible wiring board so that the piezoelectric actuator is inserted into one of the through-holes and then the other from the opposite surface and both the ends in the longitudinal direction of the piezoelectric actuator contact the same surface of the flexible wiring board. The flexible wiring board is mounted so that for example the center portion or both the end portions of the piezoelectric actuator contact the panel through a part of the flexible wiring board. In this structure, a force sense is fed back to the user who performs an input operation on the panel.

In a method for producing an input apparatus according to the present invention, an input apparatus having a structure of which a piezoelectric actuator contacts a panel through a part of a flexible wiring board. Since the thickness of the flexible wiring board can be controlled with relatively high accuracy, in this structure, the accuracy of the mounting position in the thickness direction of the piezoelectric actuator is improved. In addition, drive force of the piezoelectric actuator can be effectively transferred to the panel and so forth. In addition, when the piezoelectric actuator is mounted to a pair of through-holes formed in the flexible wiring board and it is disposed on the rear surface of the panel or an edge portion of the front surface of the panel, the efficiency of the mounting work for the piezoelectric actuator is improved. Thus, an input apparatus having a panel that has a high performance force sense feedback function can be provided at low cost.

BRIEF DESCRIPTION OF DRAWINGS

FIG. 1 is an exploded perspective view showing the structure of an input apparatus according to a first embodiment of the present invention.

FIG. 2 is a plan view showing the structure of a flexible board.

BEST MODES FOR CARRYING OUT THE INVENTION

Figure 3A:
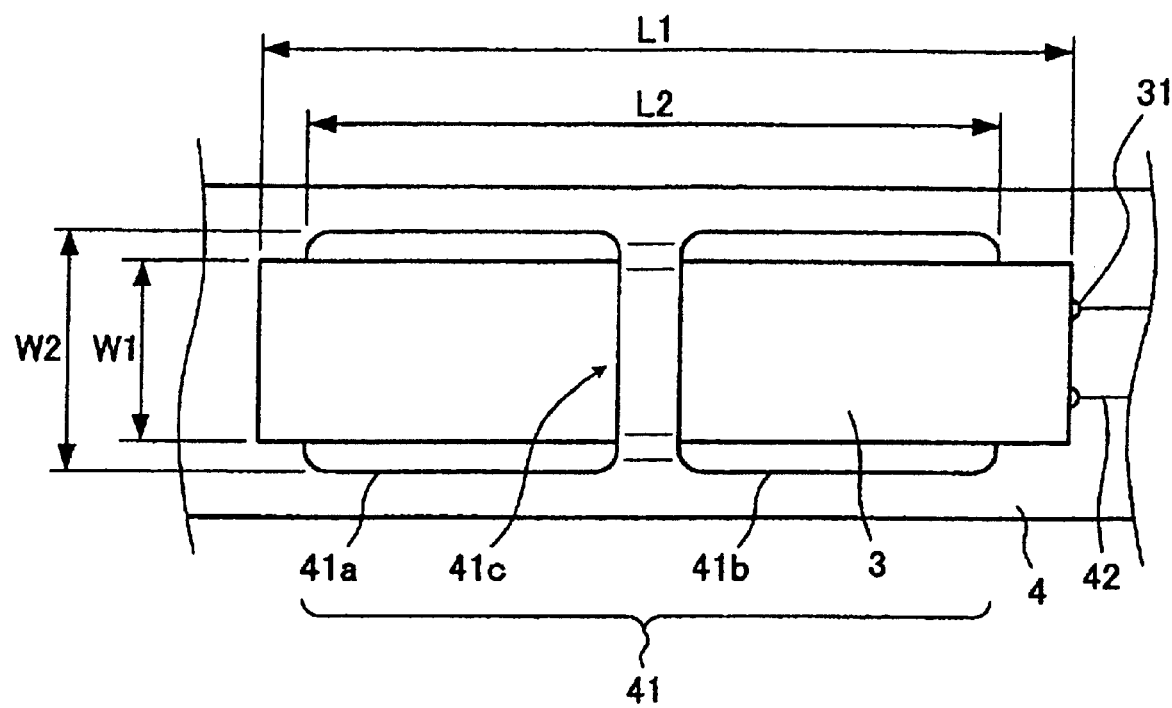
FIG. 3A and FIG. 3B are schematic diagrams showing a mounting state of a piezoelectric actuator on a flexible board.

Next, with reference to the accompanying drawings, preferred embodiments of the present invention will be described. The preferred embodiments that follow have technically preferable limitations. However, it should be noted that the scope of the present invention is not limited to these embodiments unless they describe limitations of the present invention.

First Embodiment

FIG. 1 is an exploded perspective view showing the structure of an input apparatus according to a first embodiment of the present invention.

The input apparatus shown in FIG. 1 is composed of a liquid crystal display portion 1 and a touch sensor portion 2. Fixed on the display side of the liquid crystal display portion 1 is a flexible board 4 on which a piezoelectric actuator 3 is mounted.

The liquid crystal display portion 1 comprises a display panel 11 and a frame 12. The display panel 11 displays a picture. The frame 12 holds the display panel 11. Disposed in the display panel 11 are a liquid crystal substrate, a backlight, and so forth (not shown). The frame 12 is made from for example a metal. The frame 12 is disposed on the display surface of the display panel 11 so that the frame 12 does not obstruct the display area of the picture.

The touch sensor portion 2 is an unit that has a sensor and so forth that detect whether the touch sensor portion 2 has been pressed by the user at what position. The touch sensor portion 2 has a pressing portion 21 and a frame 22. The pressing portion 21 is pressed by the user. The frame 22 holds the pressing portion 21. The pressing portion 21 is made of a transparent resin sheet or the like. The pressing portion 21 transmits a picture that the display panel 11 of the liquid crystal display portion 1 displays. The frame 22 is made from for example a metal. The frame 22 is disposed so that it does not obstruct the display area of the display panel 11.

The touch sensor portion 2 according to this embodiment uses the so-called resistance film type to detect whether the touch sensor portion 2 has been pressed at what position. In this case, the pressing portion 21 has a structure of which a plurality of electrode sheets on which a transparent electrode is formed are layered so that they are equally spaced and the electrode surfaces are oppositely aligned. Disposed in the frame 22 is circuitry that applies a voltage to the electrode sheets and detects voltages therefrom. When the pressing portion 21 is pressed by a user's finger or a pointing device such as a pen, the electrode sheets contact each other. By detecting resistance changes of the electrode sheets, the position that is pressed can be identified.

The piezoelectric actuator 3 is composed of a piezoelectric bi-morph device. The piezoelectric actuator 3 curves and deforms corresponding to a control voltage supplied through electrodes formed on the flexible board 4.

The flexible board 4 is a flexible wiring board on which electrodes are formed with conductive metal foil such as copper foil on a resin film for example polyimide. A pair of through-holes (that will be described later) are formed in the piezoelectric actuator 3. With the through-holes, the piezoelectric actuator 3 is held.

The touch sensor portion 2 is disposed so that the flexible board 4 and the piezoelectric actuator 3 are sandwiched by the front surface of the liquid crystal display portion 1 and the touch sensor portion 2. The pressing portion 21 of the touch sensor portion 2 transmits a picture of operation function items such as icons displayed on the display panel 11 of the liquid crystal display portion 1. When the user touches a picture display position on the pressing portion 21 with his or her finger or a pointing device such as a pen, an input operation corresponding to the displayed picture is performed.

In addition, the touch sensor portion 2 is disposed so that it can vertically move to and from the display surface of the liquid crystal display portion 1. Thus, as the piezoelectric actuator 3 curves and deforms, the distance between the liquid crystal display portion 1 and the touch sensor portion 2 varies. Thus, at timing the user presses the pressing portion 21 of the touch sensor portion 2, the piezoelectric actuator 3 curves and deforms. As a result, a force sense is fed back to the user. The user can feel as if he or she pressed (clicked) a switch button.

The liquid crystal display portion 1 and the touch sensor portion 2 are normally encased in an outer casing (not shown)

made of a metal or plastics. The liquid crystal display portion 1 is fixed to the inside of the outer casing. The outer casing has an opening portion that does not obstruct the display surface of the display panel 11. Elastic cushions such as rubber, metal, or the like are disposed between the rear surface having an opening of the outer casing and the display surface of the frame 22 of the touch sensor portion 2. Thus, the touch sensor portion 2 is held so that it can be moved in the vertical direction of the display surface.

Next, a method for mounting the piezoelectric actuator 3 on the flexible board 4 will be described. FIG. 2 is a plan view showing the structure of the flexible board 4.

As shown in FIG. 2, formed on the flexible board 4 are a mounting portion 41 and a wiring pattern 42. The mounting portion 41 is composed of a pair of through-holes 41a and 41b. The wiring pattern 42 supplies a drive voltage to the piezoelectric actuator 3.

Formed and aligned in the mounting portion 41 are the through-holes 41a and 41b that have the same shape. A center spacer portion 41c is formed between the through-holes 41a and 41b. The center spacer portion 41c is made of a resin film that is left in a bridge shape from the flexible board 4. The center spacer portion 41c functions as a spacer for the piezoelectric actuator 3 and the touch sensor portion 2. According to this embodiment, the two mounting portions 41 are disposed on the flexible board 4.

The wiring pattern 42 is formed so that two lines are connected between the two mounting portions 41. With the wiring pattern 42, a drive voltage is supplied from a driver (not shown) to the piezoelectric actuator 3.

Figure 3B:
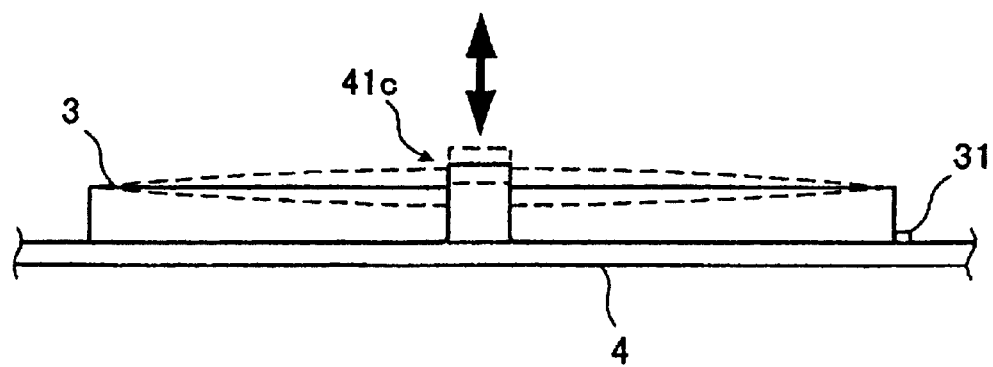

FIG. 3 shows a mounting state of the piezoelectric actuator 3 on the flexible board 4. FIG. 3A is a plan view, whereas FIG. 3B is a side view.

FIG. 3 shows a mounting state of the piezoelectric actuator 3 in an area surrounded by circle A of FIG. 2. As shown in the drawings, the piezoelectric actuator 3 is inserted into the through-hole 41a from the front of the mounting portion 41. Then, the piezoelectric actuator 3 is inserted into the through-hole 41b from the rear of the mounting portion 41 through the center spacer portion 41c. As a result, the piezoelectric actuator 3 is mounted on the flexible board 4 so that both ends in the longitudinal direction of the piezoelectric actuator 3 contact the front surface of the flexible board 4. The piezoelectric actuator 3 is relatively highly rigid and the flexible board 4 easily deforms. Thus, as shown in FIG. 3B, the piezoelectric actuator 3 is held by the mounting portion 41 in the state that only the center spacer portion 41c deforms upward.

Now, as shown in FIG. 3A, it is assumed that the length of the piezoelectric actuator 3 is L1, the width thereof is W1, the distance between the outer end portions of the through-holes 41a and 41b aligned in the mounting portion 41 is L2, and the width of each of the through-holes 41a and 41b is W2. To insert the piezoelectric actuator 3 into the through-holes 41a and 41b and contact both the end portions of the piezoelectric actuator 3 to the flexible board 4, the through-holes 41a and 41b need to be formed so that the relations of L1>L2 and W1<W2 are satisfied.

In the mounting state, when wiring terminals 31 are formed on one end portion of the piezoelectric actuator 3, the wiring terminals 31 can be easily contacted to the wiring pattern 42 on the flexible board 4 so that they are electrically connected. In reality, after they are contacted, the contacts are for example solder-fixed. As a result, the piezoelectric actuator 3 itself is fixed on the flexible board 4.

After the piezoelectric actuator 3 has been mounted in the foregoing manner, the flexible board 4 is disposed between the frame 12 of the liquid crystal display portion 1 and the frame 22 of the touch sensor portion 2. At this point, the rear surface (lower surface shown in FIG. 3B) of the mounting surface of the piezoelectric actuator 3 of the flexible board 4 contacts the frame 12 of the liquid crystal display portion 1. The front surface of the center spacer portion 41c contacts the frame 22 of the touch sensor portion 2.

When a drive voltage is supplied to the piezoelectric actuator 3 in this state, the piezoelectric actuator 3 curves and deforms. At this point, as the center portion of the piezoelectric actuator 3 deforms, the center spacer portion 41c vertically moves toward the liquid crystal display portion 1. Thus, as the center spacer portion 41c deforms, the touch sensor portion 2 moves. As a result, the force feedback function for the user is accomplished.

The force sense feedback is operated in the following manner. When the user touches the pressing portion 21 of the touch sensor portion 2 with his or her finger or a pointing device, an input is detected. When an input has been detected, a drive voltage is applied to the piezoelectric actuator 3 so that the center portion of the piezoelectric actuator 3 deforms toward the touch sensor portion 2. Immediately after this, the potential of the drive voltage is inversed so that the center portion of the piezoelectric actuator 3 deforms toward the liquid crystal display portion 1. Thereafter, the drive voltage is gradually decreased to 0 V. As a result, the piezoelectric actuator 3 is restored to the original shape.

After the touch sensor portion 2 is moved in the reverse direction of the pressing direction, the touch sensor portion 2 is moved in the pressing direction. As a result, the amount of deformation of the touch sensor portion 2 becomes large. Immediately after pressing the pressing portion 21, the user feels a pushback force from the pressing portion 21. The user presses the pressing portion 21 against the pushback force. Thus, the user can feel a click sense similar to the real button operation. As a result, the user can securely feel an input operation as a force sense.

A reinforcement plate made of a high rigidity material such as celluloid may be adhered on the front surface of the center spacer portion 41c or the rear surface of the flexible substrate 4 both the end portions of the piezoelectric actuator 3 contact. When the piezoelectric actuator 3 curves and deforms, a drive force is transferred through these portions to the frames 12 and 22. Thus, the reinforcement plate suppresses the amount of deformation of the piezoelectric actuator 3 from the frames 12 and 22. In addition, the reinforcement plate prevents the resin film that composes the flexible board 4 from deforming and breaking due to friction and shock.

When the piezoelectric actuator 3 is mounted, both the end portions of the piezoelectric actuator 3 and the center spacer portion 41c contact the frames 12 and 22 through the resin film that composes the flexible board 4. Thus, the resin film of the flexible board 4 functions as a spacer through which the piezoelectric actuator 3 contacts the frames 12 and 22.

When the user presses the touch sensor portion 2 and it deforms, such a spacer needs to maintain a height that exceeds the amount of deformation at the center portion of the piezoelectric actuator 3. When the deformation in the thickness direction of the piezoelectric actuator 3 is decreased, the drive force of curving and deforming of the piezoelectric actuator 3 can be effectively transferred.

The flexible board 4 can be produced so that it has a predetermined thickness with relatively high accuracy. In addition, when the touch sensor portion 2 is pressed, the amount of deformation in the height direction of the flexible board 4 is small. Thus, the flexible board 4 is very suitable for a sheet material for a spacer. In reality, when the length L1 of the piezoelectric actuator 3 is around 30 mm and a drive voltage of around 20 V is applied to the piezoelectric actuator 3, the maximum amount of deformation on one surface of the center portion is around 70 μm. At this point, the flexible board 4 needs to have a thickness of around 100 μm. However, this flexible board 4 can be easily produced.

In addition to the function for the spacer and the function for holding the piezoelectric actuator 3, the flexible board 4 has a function for wiring the piezoelectric actuator 3. Conventionally, the piezoelectric actuator 3 is wired with lead wires. In contrast, according to the present invention, since a wiring pattern is formed on the flexible board 4, it can be effectively wired in a limited space.

In addition, the wiring terminals 31 of the piezoelectric actuator 3 and one end of the flexible board 4 are solder-fixed. The other portions of the piezoelectric actuator 3 (for example, the other end of the piezoelectric actuator 3 and the portion at which the piezoelectric actuator 3 contacts the center spacer portion 41c) are not fixed to the flexible board 4. Thus, when the piezoelectric actuator 3 curves and deforms, an extra force is not imposed from the flexible board 4 to the piezoelectric actuator 3. The drive force by deformation of the piezoelectric actuator 3 is effectively transferred to the touch sensor portion 2. In addition, when the piezoelectric actuator 3 becomes defective, by unsoldering the wiring terminals 31, the piezoelectric actuator 3 can be removed from the flexible board 4. Thus, the maintainability of the piezoelectric actuator 3 is very high.

Figure 4:
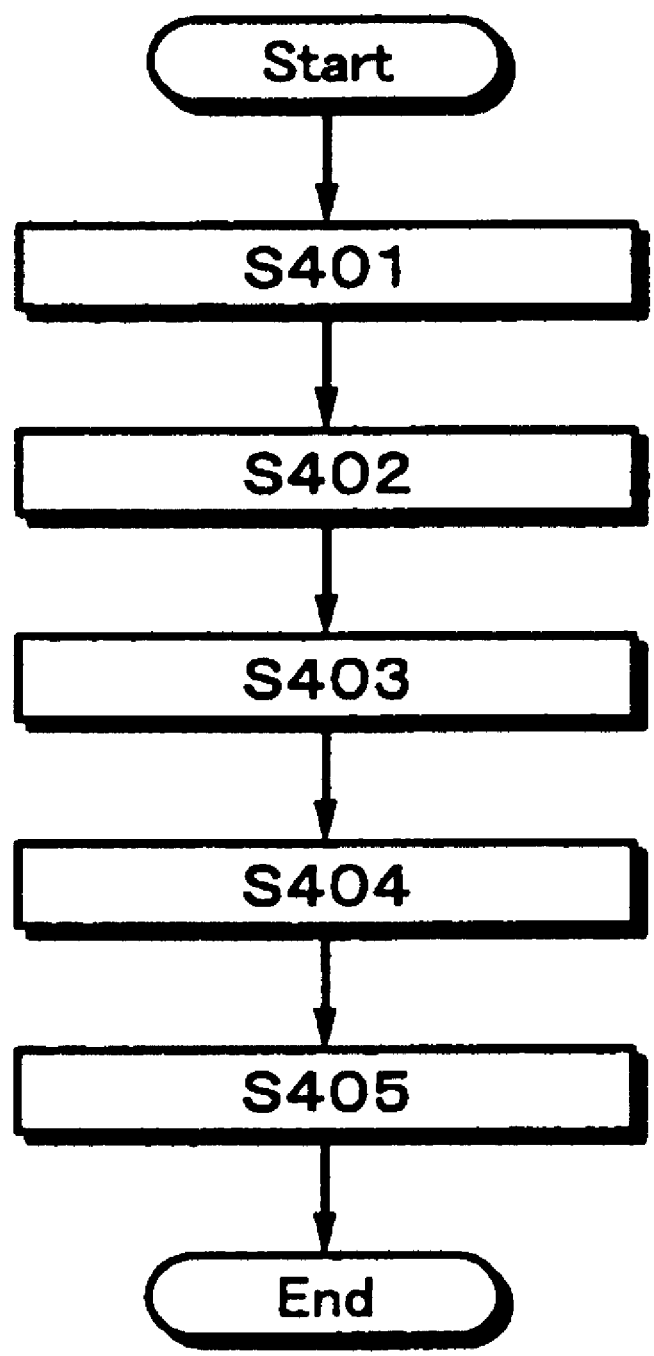
FIG. 4 is a flow chart showing producing steps of the input apparatus according to the first embodiment of the present invention.

Next, the producing steps of the input apparatus will be described step by step. FIG. 4 is a flow chart showing the producing steps of the input apparatus.

At step S401, the flexible board 4 is produced. The flexible board 4 is produced in the following manner. A base film is formed by coating a metal foil such as electrodeposited copper foil or rolled copper foil on one entire surface of a film-shaped polyimide resin. Thereafter, the wiring pattern 42 is formed on the front surface of the base film by the lithography technology or the like. Thereafter, various fixing holes such as the through-holes 41a and 41b are formed in the base film. Thereafter, an insulating material is coated on the front surface of the base film.

At step S402, the piezoelectric actuator 3 is mounted on the flexible board 4. As described above, the piezoelectric actuator 3 is inserted into the through-hole 41a of the mounting portion 41 from the front surface and then into the through-hole 41b of the mounting portion 41 from the rear surface. As a result, the piezoelectric actuator 3 can be easily mounted on the flexible board 4. At step S403, the wiring terminals 31 of the piezoelectric actuator 3 are soldered to the wiring pattern 42 on the flexible board 4. This step is performed by using for example a laser. As a result, the piezoelectric actuator 3 is fixed on the flexible board 4.

At step S404, the liquid crystal display portion 1 is assembled. Thereafter, the flexible board 4 is mounted on the frame 12 of the liquid crystal display portion 1. The flexible board 4 is fixed to the frame 12 with machine screws or the like. At this point, the wiring pattern 42 on the flexible board 4 is connected to predetermined wiring terminals of a driver (not shown). At step S405, the touch sensor portion 2 is mounted on the display surface side of the liquid crystal display portion 1.

In the foregoing producing steps, by inserting the piezoelectric actuator 3 into the through-holes 41a and 41b, the piezoelectric actuator 3 is mounted on the flexible board 4. By fixing the flexible board 4 on the liquid crystal display portion 1, the piezoelectric actuator 3 can be easily mounted with high positional accuracy. In addition, since the piezoelectric actuator 3 is held with the flexible board 4, the piezoelectric actuator 3 can be easily wired.

As described above, in the input apparatus of the present invention, the accuracy of mounting position of the piezoelectric actuator 3, the transfer efficiency of the drive force, and the routing efficiency of wires are improved. In addition, the piezoelectric actuator 3 can be easily mounted. Thus, the input apparatus having high performance force sense feedback function can be accomplished at low cost.

According to this embodiment, four piezoelectric actuators are disposed around the display area of the liquid crystal display portion. Alternatively, more than four piezoelectric actuators may be disposed. Alternatively, three or more piezoelectric actuators may be disposed on one flexible board. Alternatively, flexible boards on which a piezoelectric actuator is mounted may be disposed on both the longer sides and the shorter sides of the display panel. However, it is preferred that the piezoelectric actuators should be symmetrically disposed with respect to the center portion of the display panel.

Second Embodiment

Figure 5:
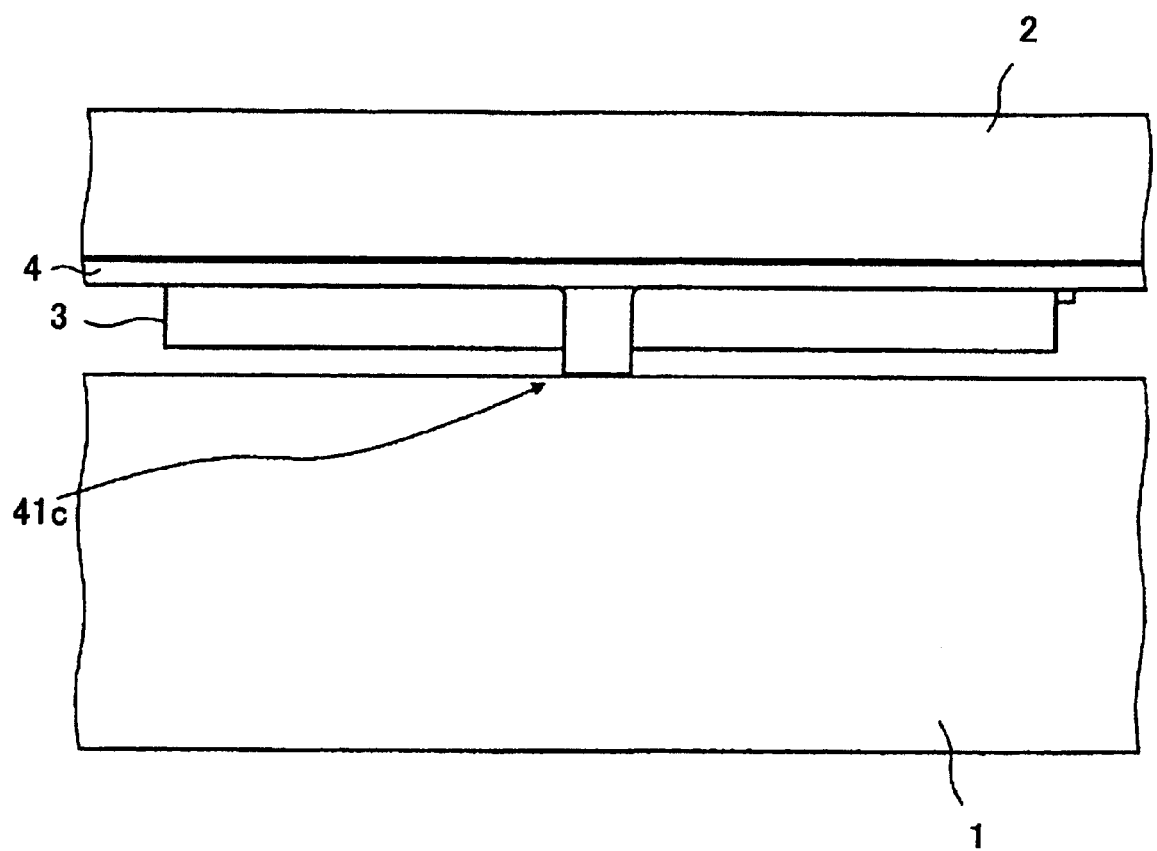
FIG. 5 is a schematic diagram showing a mounting structure of a piezoelectric actuator of an input apparatus according to a second embodiment of the present invention.

Next, as an example of a modification of the foregoing input apparatus, the case of which the piezoelectric actuator 3 is mounted on the flexible board 4 in the reverse direction of the foregoing inputting apparatus. FIG. 5 shows a mounting structure of a piezoelectric actuator 3 of an input apparatus according to a second embodiment of the present invention.

FIG. 5 is a side view showing the mounting structure of the piezoelectric actuator 3 on the flexible board 4. According to the second embodiment shown in this drawing, the piezoelectric actuator 3 is mounted on the opposite surface of the flexible board 4. Thus, when the piezoelectric actuator 3 is mounted, the center spacer portion 41c deforms toward the liquid crystal display portion 1. The center spacer portion 41c contacts the frame 12 of the liquid crystal display portion 1. Both the end portions of the piezoelectric actuator 3 contact the front surface of the flexible substrate 4. The rear surface of the flexible substrate 4 contacts the frame 22 of the touch sensor portion 2.

The operation of the input apparatus is the same as that of the first embodiment. The piezoelectric actuator 3 is mounted corresponding to the structure of the frames 12 and 22 of the liquid crystal display portion 1 and the touch sensor portion 2.

Third Embodiment

Next, an input apparatus having a simpler mounting structure of a piezoelectric actuator and a flexible substrate for higher production efficiency than the foregoing input apparatuses will be described.

Figure 6A:
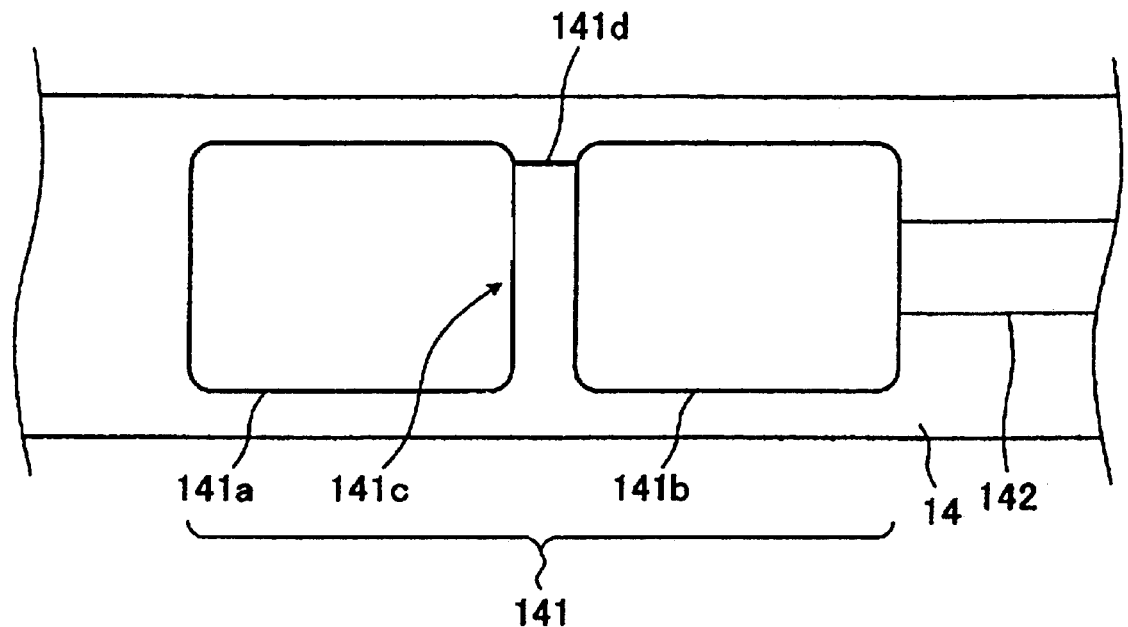
FIG. 6A and FIG. 6B are schematic diagrams showing the structure of an input apparatus according to a third embodiment of the present invention.
Figure 6B:
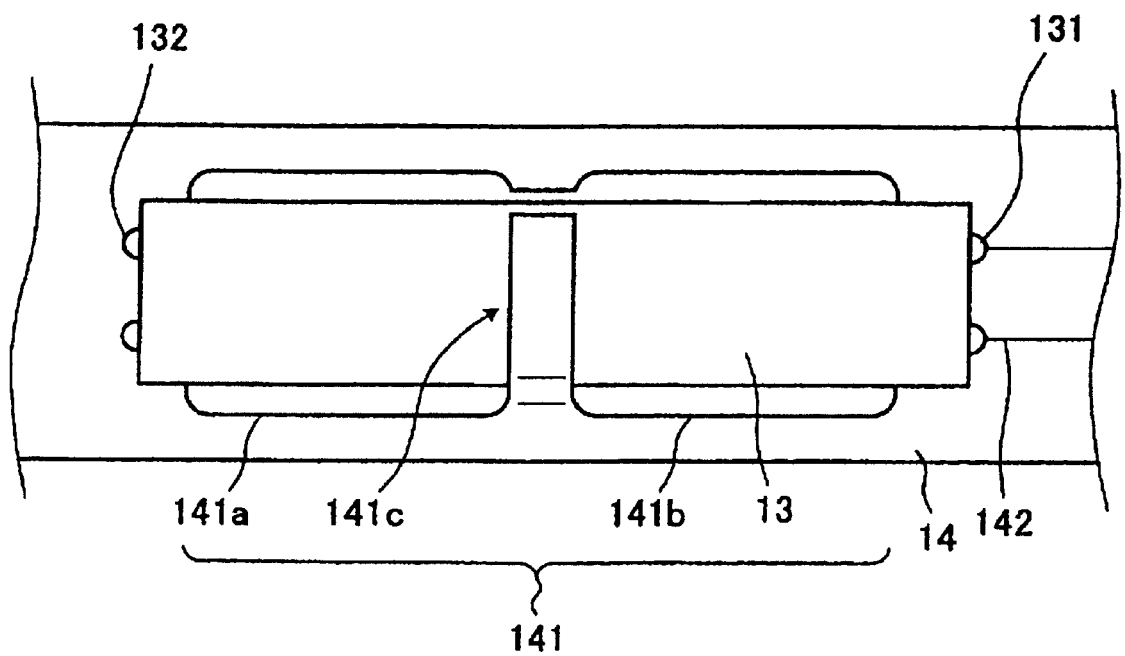

FIG. 6 shows the structure of an input apparatus according to a third embodiment of the present invention. FIG. 6A shows the structure of a flexible board. FIG. 6B shows the structure of which a piezoelectric actuator has been mounted on the flexible board.

In a flexible board 14 shown in FIG. 6A, as a mounting portion 141 of a piezoelectric actuator 13, a pair of through-holes 141a and 141b are formed. In addition, a center spacer portion 141c is formed between the through-holes 141a and 141b. The center spacer portion 141c is straightly cut at a cut portion 141d. As shown in FIG. 6B, an end portion in the longitudinal direction of the piezoelectric actuator 13 contacts the upper surface of the flexible board 14 through the mounting portion 141. In addition, the center spacer portion 141c is disposed above the piezoelectric actuator 13.

Like the foregoing embodiments, disposed at one end in the longitudinal direction of the piezoelectric actuator 13 are wiring terminals 131 that are connected to a wiring pattern 142. The wiring terminals 131 are solder-connected to the wiring pattern 142.

In this structure, although the center spacer portion 141c is cut at the cut portion 141d, the center spacer portion 141c has almost the same function for a spacer disposed between the piezoelectric actuator 13 and the touch sensor portion or the liquid crystal display portion as the first and second embodiments. Thus, when the flexible board 14 is disposed between the touch sensor portion and the liquid crystal display portion, the positional accuracy in the thickness direction of the piezoelectric actuator 13 is improved. As a result, a high performance force sense feedback function is accomplished.

However, since the center spacer portion 141c is cut, the flexible board 14 itself cannot hold the piezoelectric actuator 13. The piezoelectric actuator 13 and the flexible board 14 are solder-fixed at the wiring terminals 131. Thus, when the input apparatus is produced if it is shocked, the piezoelectric actuator 13 may fall off the flexible board 14. Thus, it is preferred that the other end portion (non-wiring terminal side) of the piezoelectric actuator 13 should be solder-fixed to the flexible board 14 so as to securely fix the piezoelectric actuator 13 and the flexible board 14.

In the example shown in FIG. 6B, formed at the opposite end portion of the piezoelectric actuator 13 are fixing terminals (non-electric terminals) 132 used to be fixed. In addition, a fixing pattern (not shown) is formed at positions that the fixing pattern contacts the terminals 132 on the flexible board 14. The fixing terminals 132 and the pattern on the flexible board 14 are soldered to fix the other end portion of the piezoelectric actuator 13 to the flexible board 14.

Figure 7:
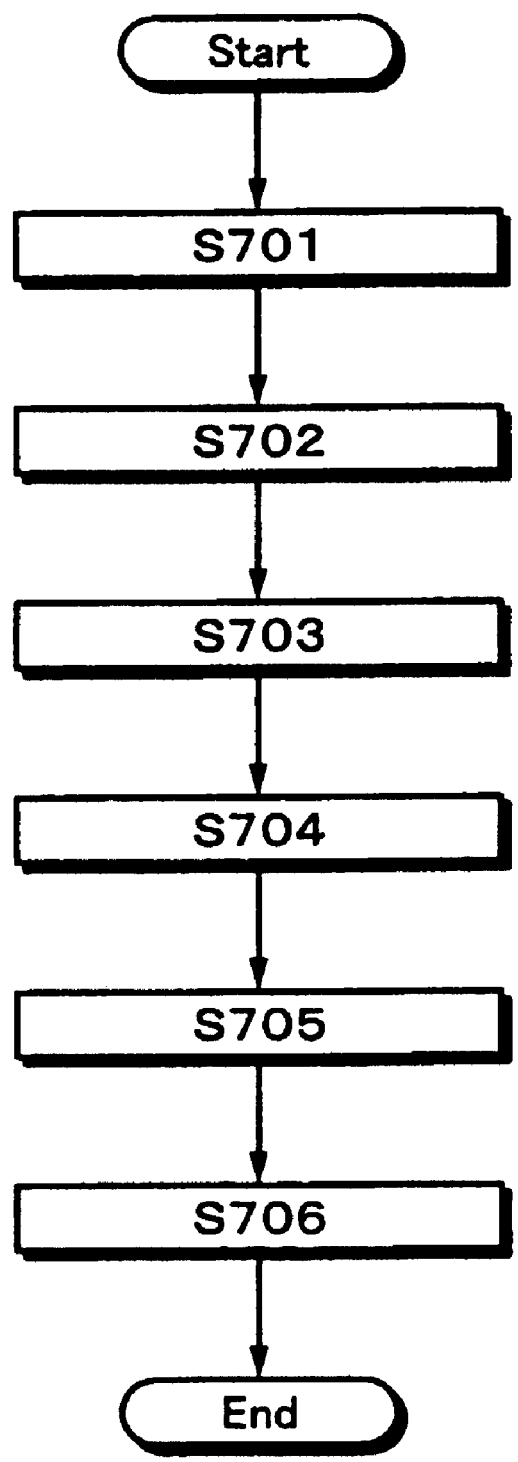
FIG. 7 is a flow chart showing producing steps of the input apparatus according to the third embodiment of the present invention.

FIG. 7 is a flow chart showing productions steps of the input apparatus according to this embodiment.

At step S701, the flexible board 14 on which the mounting portion 141 and the wiring pattern 142 are formed is produced. At step S702, the piezoelectric actuator 13 is mounted on the flexible board 14. At this point, the piezoelectric actuator 13 is mounted so that it bridges the through-holes 141a and 141b in their aligned direction. At step S703, the wiring terminals 131 and the fixing terminals 132 formed on both the end portions of the piezoelectric actuator 13 are soldered to their corresponding patterns on the flexible board 14. This step is performed by using for example a laser.

At step S703, the center spacer portion 141c formed between the through-holes 141a and 141b is placed on the lower surface side of the piezoelectric actuator 13. At step S704, the center spacer portion 141c is pulled out. This step can be easily performed for example by passing a thinner straight jig placed below the piezoelectric actuator 13 from the lower side of the center space portion 141c through the cut portion 141d. Thus, it is preferred that the cut portion 141d should be formed in an end portion side in the width direction of the center spacer portion 141c.

At step S705, the flexible board 14 is mounted on the frame of the liquid crystal display portion. At step S706, the touch sensor portion is mounted on the front surface side of the liquid crystal display portion. Alternatively, after the flexible board 14 is mounted on the touch sensor portion side, the liquid crystal display portion may be mounted.

In the foregoing producing steps, after the piezoelectric actuator 13 is mounted on the flexible board 14 and then fixed, the center spacer portion 141c is pulled out. In this method, unlike the first and second embodiments, without necessity of a step for inserting the piezoelectric actuator into one of the through-holes from the front surface and then into the other of the thresh-holes from the rear surface, the piezoelectric actuator 13 can be more simply mounted than the first and second embodiments. Thus, the cost of the production apparatus can be reduced and the mounting time can be decreased.

In addition, according to this embodiment, since the flexible board 14 itself does not hold the piezoelectric actuator 13, it is preferred that both the ends of the piezoelectric actuator 13 should be soldered to corresponding portions of the flexible substrate 14. Since the soldering step can be performed after or while the wiring terminals 131 and the wiring pattern 142 are soldered, the production efficiency is not remarkably decreased.

Thus, according to this embodiment, the input apparatus having high performance force sense feedback function can be accomplished at low cost. It would be advantageous for this input apparatus to be automatically produced in quality.

The shapes of the through-holes formed in the flexible board and the shape of the flexible board are not limited to those of the foregoing embodiments. They may be formed in accordance with the shapes of the piezoelectric actuators, the shape of the liquid crystal display portion, the shape of the frame of the touch sensor portion, and so forth.

Fourth Embodiment

When a voltage is applied to a piezoelectric actuator, it deforms. In contrast, when a force is applied to the piezoelectric actuator, it generates a voltage. When the piezoelectric actuator generates a voltage, the piezoelectric actuator structurally functions as a capacitor that stores electric charges. Thus, if a pressure is applied to the piezoelectric actuator in its production stage, an electromotive force causes a large amount of electric charges to store in the piezoelectric actuator. The electric charges may damage the piezoelectric actuator.

Figure 8:
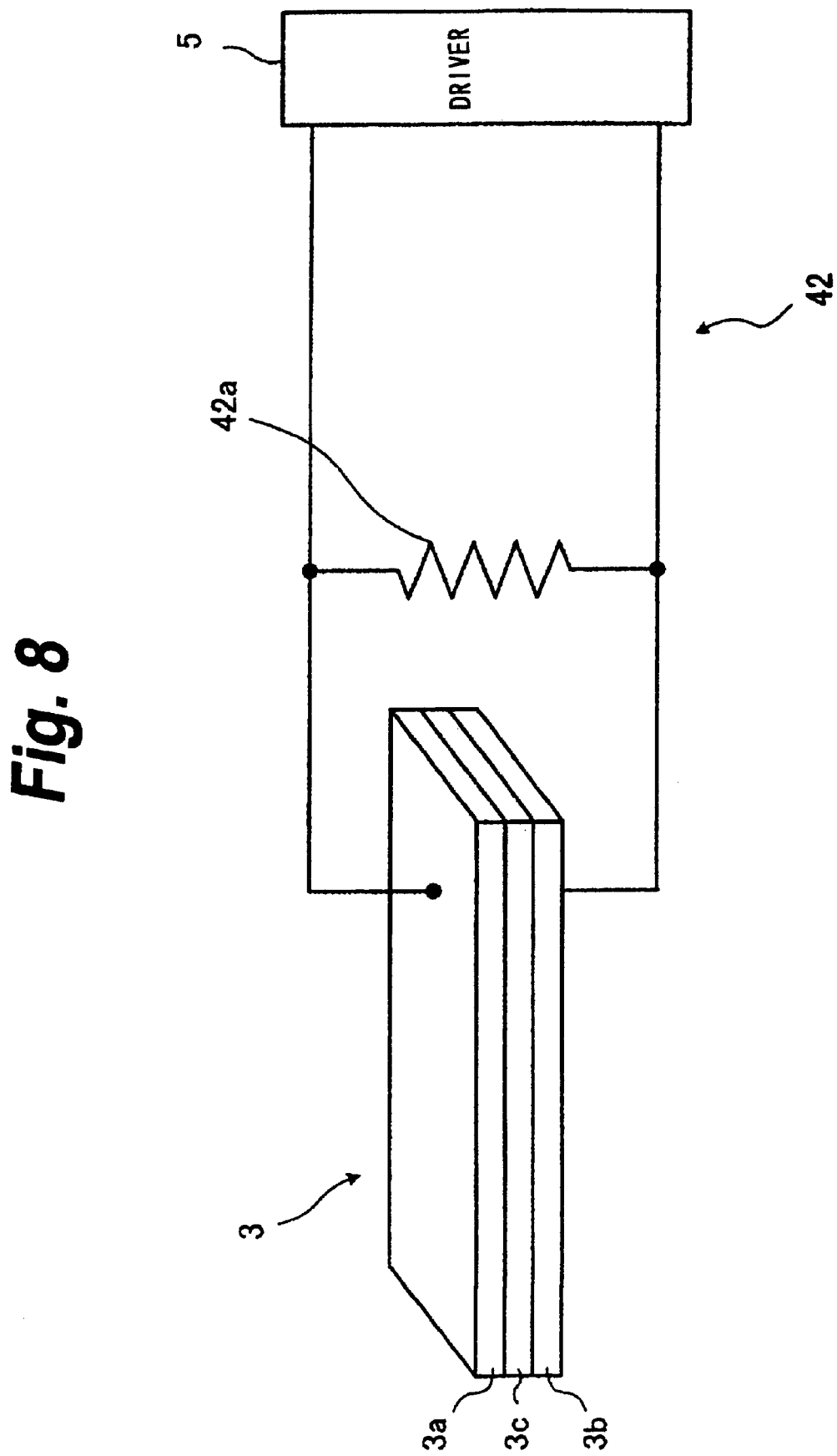
FIG. 8 is a circuit diagram showing wiring of a piezoelectric actuator of an input apparatus according to a fourth embodiment of the present invention.

To prevent the piezoelectric actuator from being damaged with electric charges, a resistor is disposed between wiring terminals. Next, an example of an input apparatus that has such a resistor will be described. FIG. 8 is a circuit diagram showing wiring of a piezoelectric actuator of an input apparatus according to a fourth embodiment of the present invention.

FIG. 8 shows an example of a piezoelectric actuator 3 that has two piezoelectric layers 3a and 3b made of a piezoelectric material and an electrode plate 3c that is sandwiched by the piezoelectric layers 3a and 3b. A driver 5 applies a drive voltage to the piezoelectric actuator 3 under the control of a controlling portion (not shown). The piezoelectric layers 3a and 3b are connected with a wiring pattern 42 formed on a flexible board 4. In FIG. 8, as a example, a resistor 42a having a predetermined resistance is connected between electrodes of the piezoelectric layers 3a and 3b. It is preferred that the resistor 42a should be connected immediately before the piezoelectric actuator 3 is mounted on the flexible board 4.

In this input apparatus, if the piezoelectric actuator 3 generates a voltage with an applied shock in for example a production stage, a current flows through the resistor 42a disposed between the electrodes. As a result, the shock applied to the piezoelectric actuator 3 is absorbed by the resistor 42a. According to the present invention, since the flexible board 4 is disposed between the piezoelectric actuator 3 and the driver 5, with the resistor 42a patterned on the flexible board 4, the piezoelectric actuator 3 can be prevented from being damaged in the production stage.

In the foregoing embodiments, the touch sensor portion of resistor film type is used. Alternatively, a touch sensor portion of another type can be used for a piezoelectric actuator to accomplish the force sense feedback function. With touch sensor portions of for example electrostatic capacity type, optical type, and ultrasonic type, the force sense feedback function can be accomplished.

When the touch sensor portion of electrostatic capacitor type is used, a finger touch portion is composed of a transparent electroconductive sheet. In addition, circuitry for applying a voltage and detecting a current is disposed in a frame at an outer edge of the touching portion. A constant voltage is applied to the electroconductive sheet. When the user touches the electroconductive sheet with his or her finger, the electrostatic capacity of the sheet varies. Thus, the detected current value also varies. With the detected current value, it is detected whether the electroconductive sheet has been touched at what coordinates thereof.

When a touch sensor portion of optical type is used, a touching portion is composed of a transparent panel made of glass, acrylic resin, or the like. Light emitting devices such as LEDs (Light Emitting Diodes) and light receiving devices are disposed in a frame at an outer edge of the touching portion. The front surface of the touching portion is irradiated in a matrix shape with infrared rays. The infrared rays are received by the opposite side light receiving devices. Thus, when a position at which light is obstructed is identified, coordinates of the finger that touches the touching portion can be detected.

When a touch sensor portion of ultrasonic type is used, a touching portion is composed of a transparent panel like the foregoing touch sensor portions. Generators and receivers are oppositely disposed in the x direction and the y direction in a frame at an outer edge of the touching portion, respectively. The generators generate a surface elastic wave on the front surface of the touching portion. When a finger touches the touching portion, vibration (energy) of the touching portion is absorbed by the finger. As a result, the surface elastic wave delays. By detecting a transfer delay of the surface elastic wave, the coordinates of the touched position can be detected.

In these touch sensor portions, when the flexible board on which the foregoing piezoelectric actuator is mounted is disposed between the frame at an outer edge of the touch panel portion and the frame at an outer edge of the liquid crystal display portion, the touch panel portion can be moved in the vertical direction of the display surface. As a result, the force sense feedback function can be accomplished.

In these touch panel portions, a display device of another type, for example a CRT (Cathode Ray Tube) other than a liquid crystal display device (LCD), can be Used.

Fifth Embodiment

As another type, an input apparatus of electromagnetic induction type can be used. In the input apparatus of electromagnetic induction type, it is detected whether a touch panel portion has been touched at what position. When the input apparatus of electromagnetic induction type is used, the force sense feedback function using the foregoing piezoelectric actuator can be accomplished. Next, the structure of this input apparatus will be described as a fifth embodiment of the present invention.

FIG. 9 shows the structure of the input apparatus according to the fifth embodiment of the present invention. In FIG. 9, structural elements corresponding to those of the input apparatus shown in FIG. 1 are denoted by the same reference numerals.

Figure 9A:
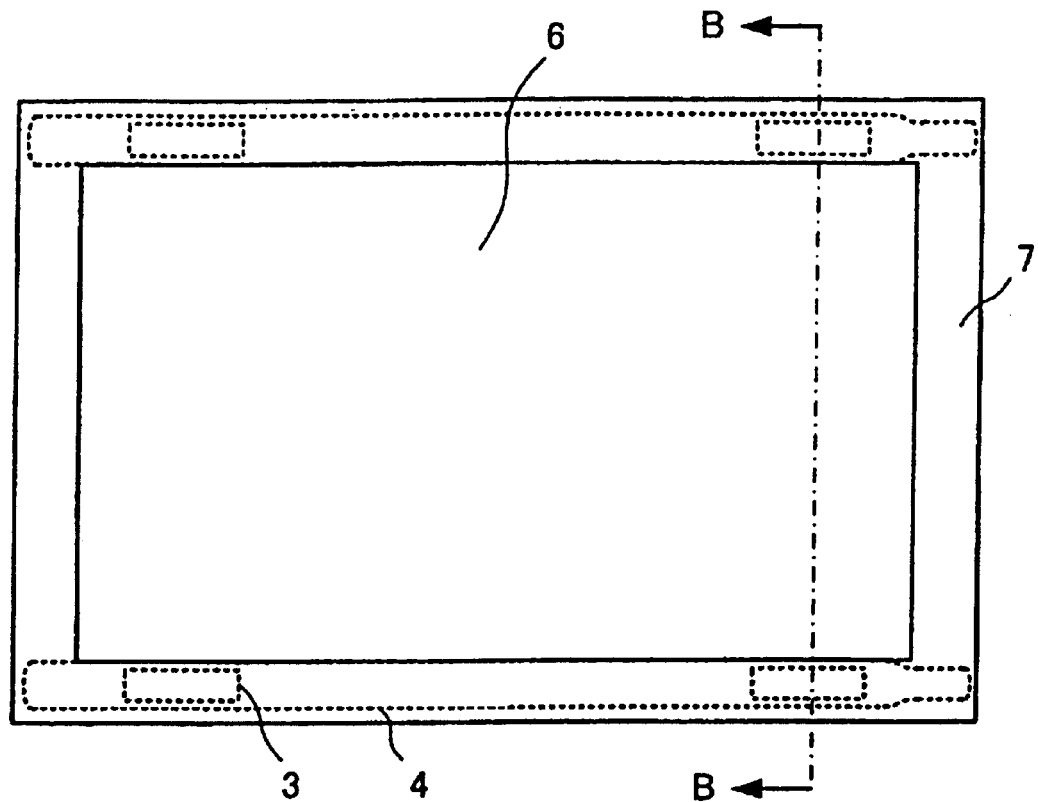
FIG. 9A and FIG. 9B are schematic diagrams showing the structure of an input apparatus according to a fifth embodiment of the present invention.

FIG. 9A is a plan view showing the input apparatus viewed from the display side. As shown in FIG. 9A, a transparent panel 6 is disposed on the display surface. The transparent panel 6 is made of glass, acrylic resin, or the like. The transparent panel 6 is encased in an outer casing 7. For reference, FIG. 9A shows mounting positions for piezoelectric actuators 3 and flexible boards 4. According to this embodiment, the flexible boards 4 are disposed on the longer side of the display surface. Two piezoelectric actuators 3 are disposed on one flexible board 4.

Figure 9B:
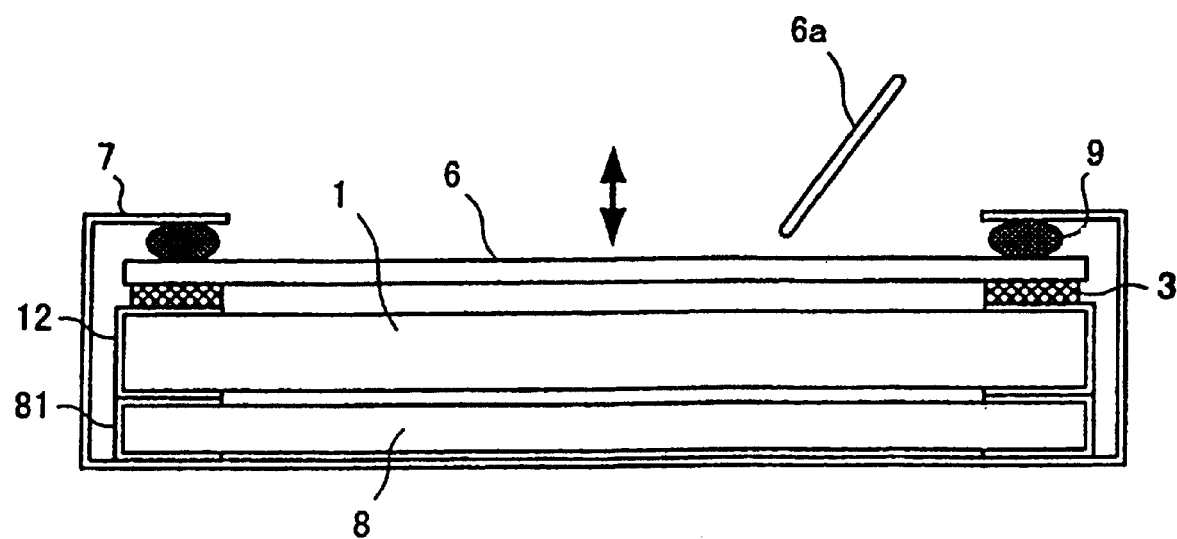

FIG. 9B is a sectional view schematically showing the input apparatus viewed from arrow B shown in FIG. 9A. As shown in FIG. 9B, the transparent panel 6, a liquid crystal display portion 1, and a sensor portion 8 that detects a touched position on the transparent panel 6 are encased in the outer casing 7.

The liquid crystal display portion 1 and the sensor portion 8 are fixed to the outer casing 7 through frames 12 and 81 disposed at outer edge portions of the liquid crystal display portion 1 and the sensor portion 8. The user can see a picture that the liquid crystal display portion 1 displays through the transparent panel 6. The piezoelectric actuator 3 is disposed between the frame 12 of the liquid crystal display portion 1 and the outer edge portion of the transparent panel 6. Cushions 9 made of an elastic member are disposed between the outer edge portions of the transparent panel 6 and the outer edge portions on the display surface side of the outer casing 7. Thus, the transparent panel 6 is held so that it is movable in the vertical direction against the outer casing 7 and the liquid crystal display portion 1. In FIG. 9B, the flexible boards on which the piezoelectric actuators 3 are mounted are omitted.

In the input apparatus, a dedicated pen type pointing device 6a is used to perform a touching operation for the transparent panel 6. Disposed in the pointing device 6a is circuitry that generates a magnetic field. Disposed in the sensor portion 6 are many sensor coils that detect the magnetic field. When the pointing device 6a contacts the transparent panel, the sensor portion 6 detects the magnetic field that the pointing device 6a generates. As a result, the transparent panel 6 can detect whether the pointing device 6a has touched the transparent panel at what position.

When the pointing device 6a touches the transparent panel 6, a controlling circuit (not shown) causes a voltage to be applied to the piezoelectric actuators 3 that vertically move the transparent panel 6 against the display surface. Thus, a force sense is fed back to the user.

According to this embodiment, the piezoelectric actuators 3, their wiring, and their mounting structure need to be disposed in the outer edge portions of the transparent panel 6 so that they do not obstruct the display surface. Thus, according to the present invention, the production efficiency and the space efficiency can be improved. In addition, the high performance force sense feedback function can be accomplished at low cost.

With the input apparatuses according to the foregoing embodiments, the user can see a picture that the display portion displays through the pressing or touching sensor portion. The input apparatuses according to the foregoing embodiments can be used as information processing devices such as personal computers (PCs) and display and input devices for automatic vending machines, ticketing machines, automatic cash dispensers (CDs), automatic teller machines (ATMs), game machines, and so forth. In addition, these input apparatuses can be preferably used as display and input devices for fixed telephone sets, portable telephone sets, portable information terminals such as PDAs, and various remote control devices.

For example, in a portable telephone set that can be connected to a network such as the Internet, when a call is originated, numeric keys can be displayed. When the portable telephone set is connected to the network, dedicated GUI images composed of icons and so forth can be displayed. In a remote control device that can control a plurality of devices, icons and so forth corresponding to each device can be displayed. According to the present invention, since the high performance force sense feedback function using the piezoelectric actuators and their holding members can be accomplished at low cost, the input apparatuses according to the present invention can be easily mounted on such small devices. As a result, the user's operational sense can be improved.

Sixth Embodiment

In the foregoing embodiments, the present invention is applied to the input apparatuses that the user can see a picture that the display portion displays through the pressing and touching sensor portion. However, the present invention can be applied to an input apparatus that does not have a function for causing an operation surface to transmit a display picture. For example, the present invention can be applied to an input pad as a pointing device disposed in an input and operation portion of a note type PC, a tablet device for drawing software, and so forth.

Next, an example of which the present invention is applied to such an input apparatus will be described. FIG. 10 shows the structure of the input apparatus according to a sixth embodiment of the present invention. In FIG. 10, structural elements corresponding to the input apparatuses shown in FIG. 1 and FIG. 9 are denoted by the same reference numerals.

Figure 10A:
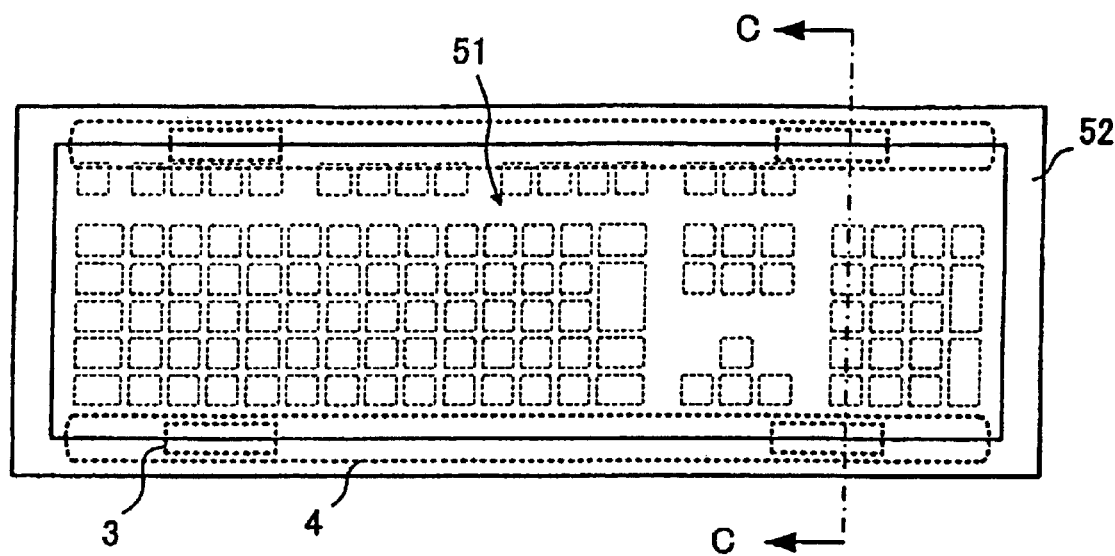
FIG. 10A and FIG. 10B are schematic diagrams showing the structure of an input apparatus according to a sixth embodiment of the present invention.

The input apparatus shown in FIG. 10 has an input and operation portion 51 whose front surface is equally flat. FIG. 10A is a plan view showing the input apparatus viewed from the operation surface side of the input and operation portion 51. A keyboard arrangement is depicted on the operation surface of the input and operation portion 51 disposed in an opening portion of an outer casing 52. The operation surface may be unevenly formed corresponding to the keyboard arrangement.

Figure 10B:
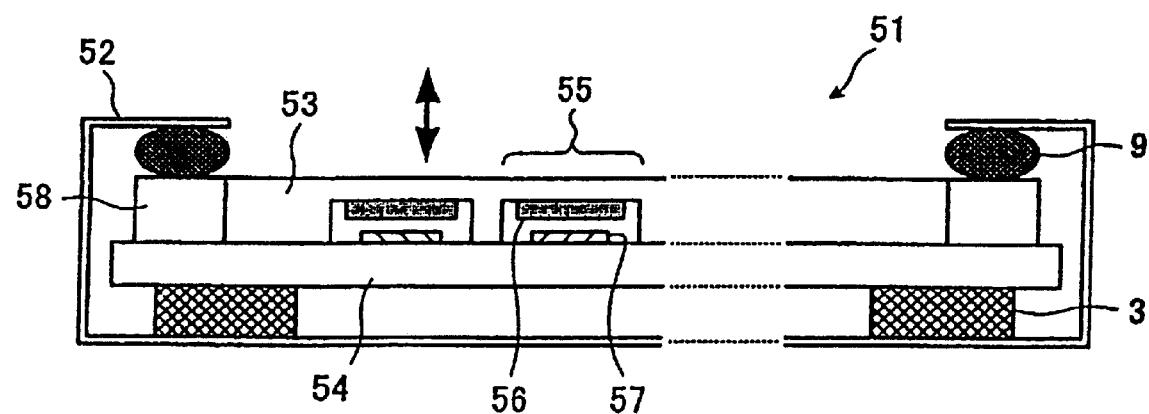

FIG. 10B is a sectional view taken from arrow C shown in FIG. 10A. As shown in FIG. 10B, encased in the outer casing 52 are a rubber sheet 53 that is an operation surface of the input and operation portion 51 and a board 54 on which the rubber sheet 53 is mounted.

The rubber sheet 53 is formed so that a cavity is formed below each key region 55 of the keyboard arrangement depicted on the upper surface (operation surface). Thus, when the user presses the key region 55, it deforms to the board 54.

In addition, an electroconductive rubber sheet 56 is adhered on the rear surface of each key region 55 of the operation surface. Disposed on the board 54 opposite to the electroconductive rubber sheet 56 is a contact portion 57 made of copper foil or the like. The electroconductive rubber sheet 56 and the contact portion 57 are connected to lead wires connected to a controlling circuit (not shown). Thus, when the key region 55 is pressed, since the rubber sheet 53 deforms, the electroconductive rubber sheet 56 contacts the contact portion 57. As a result, a key input corresponding to the key region 55 is performed.

In addition, piezoelectric actuators 3 are disposed between the lower surface of the board 54 and a lower portion of the outer casing 52. A frame 58 is disposed at an edge portion of the rubber sheet 53. Disposed between the upper surface of the frame 58 and portions that surround the opening portion of the outer casing 52 are cushions 52 having elasticity. Thus, when a voltage is applied to the piezoelectric actuators 3, the rubber sheet 53 and the board 54 move upward and downward against the outer casing 52. In FIG. 10B, the flexible boards on which the piezoelectric actuators 3 are mounted is omitted.

In this input apparatus, when the key region 55 is pressed as a key input, the piezoelectric actuator 3 is driven to move the rubber sheet 53 under the control of the controlling circuit (not shown), causing a force sense to be fed back to the user. Since the depth of a key stroke as a key input due to deformation of the rubber sheet 53 is as small as several millimeters, the force sense feedback function of the piezoelectric actuator 3 causes the user to clearly feel a click sense. As a result, the user's operational sense can be improved. In addition, since the thicknesses of the piezoelectric actuator 3 and the flexible board are as low as several millimeters, the total thickness of the input apparatus can be decreased. Thus, although the depth of the key stroke is small, a thin input apparatus that has a good operational sense can be accomplished at low cost. This input apparatus is suitable for a keyboard of a PC and so forth.

According to this embodiment, the piezoelectric actuators 3 are disposed along the edge portions on the longer sides of the input apparatus. However, when the input apparatus does not have a display device, the piezoelectric actuators may be equally disposed on the rear surface side of the operation surface. When piezoelectric actuators 3 are disposed at only edge portions, cushions made of an elastic substance may be disposed at inner positions of the input apparatus.

Seventh Embodiment

Next, a flat type input apparatus that is used as so-called tablet device will be described as an embodiment of the present invention. In this example, the input apparatus disposed in a note type PC will be described.

FIG. 11 shows the structure of a note type PC that has an input apparatus according to a seventh embodiment of the present invention.

Figure 11A:
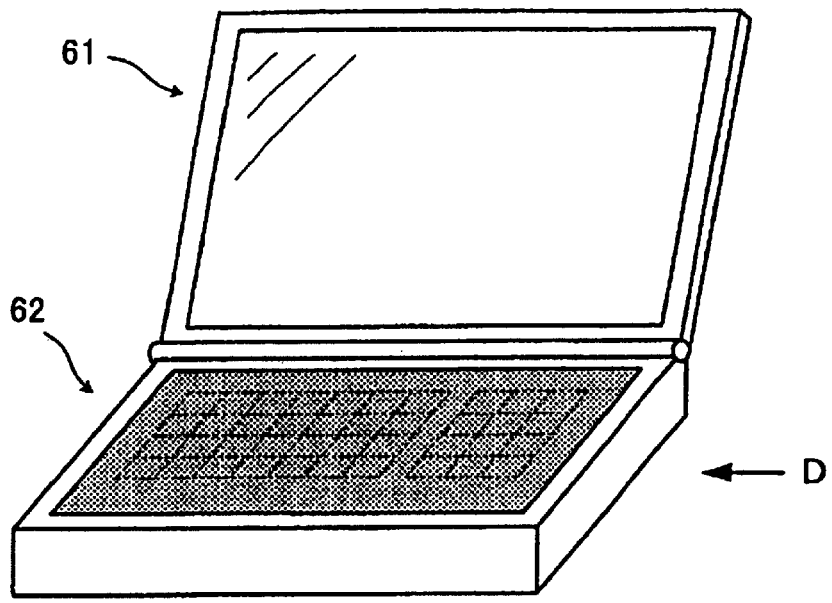
FIG. 11A and FIG. 11B are schematic diagrams showing the structure of a note type PC having an input apparatus according to a seventh embodiment of the present invention.

The note type PC shown in FIG. 11A is composed of a display portion 61 and an input portion 62. The display portion 61 can be folded up on the input portion 62 side. The display portion 61 is composed of for example an LCD. An input and operation surface of the input portion 62 is equally flat. A sheet on which a keyboard arrangement is printed is adhered on the front surface of the input and operation surface of the input portion 62.

Figure 11B:
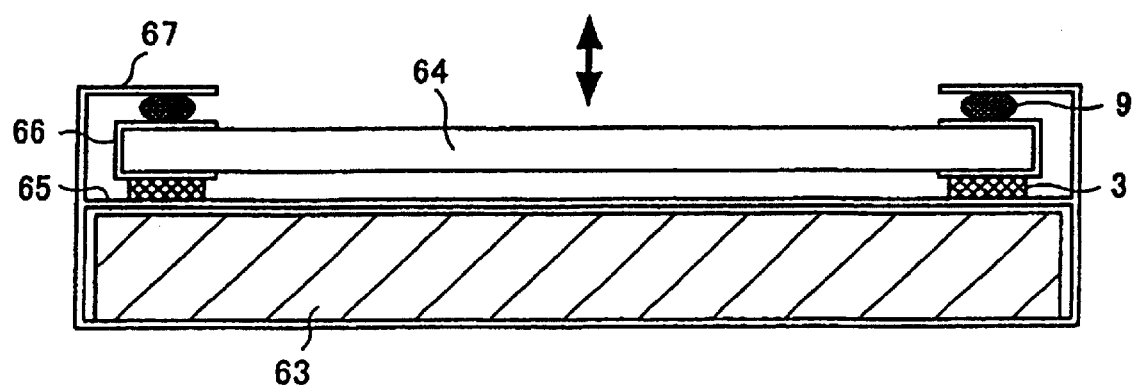

FIG. 11B is a sectional view showing the input portion 62 of the note type PC viewed from arrow D shown in FIG. 11A. As shown in FIG. 11B, the input portion 62 comprises an information processing device portion 63 that contains devices such as a processor and various recording mediums that accomplish processes and functions of the PC and a touch sensor portion 64 that detects an input operation.

The upper surface of the touch sensor portion 64 is an operation and input panel surface. The touch sensor portion 64 is of the above described resistor film type, electrostatic capacitor type, optical type, surface elastic wave type, or the like. The touch sensor portion 64 detects whether a user's finger has touched or pressed the operation and input surface at what position. The touch sensor portion 64 is disposed on a holding member 65 fixed at an outer casing of the input portion 62. Piezoelectric actuators 3 are disposed between the holding member 65 and a frame 66 of the touch sensor portion 64. Cushions 9 made of an elastic substance are disposed between the input and operation surface side of the frame 66 and the outer casing 67 on the input and operation surface side. Thus, when a voltage is applied to the piezoelectric actuators 3, the touch sensor portion 64 moves upward and downward as shown in the drawing. In FIG. 11B, the flexible boards on which the piezoelectric actuators 3 are mounted are omitted.

In the input portion 62, when an input operation to the touch sensor portion 64 is detected under the control of a controlling circuit disposed in the information processing device portion 63, the piezoelectric actuators 3 are driven to move the touch sensor portion 64, causing a force sense to be fed back to the user.

In addition, since the input operation surface of the input portion 62 is equally flat, the input operation surface can be used as for example a keyboard according to a keyboard arrangement depicted on the input operation surface. When necessary, the input operation surface can be used as a tablet device or a mouse pointer. Thus, it is not necessary for the note type PC to provide an input pad (track pad) besides the keyboard. In addition, a new function such as a drawing tablet can be added to the note type PC. Thus, the input portion 62 that is small and has high functions and high operational sense can be accomplished at low cost.

Besides the foregoing types, a touch sensor portion 64 of electromagnetic induction type may be used. In this case, an electromagnetic induction sensor portion may be disposed on the rear side of the input operation surface made of a fat plate such as plastics. The input operation surface is moved by piezoelectric actuators.

When the input operation surface is used as a keyboard, feedback intensities against user's fingers or a pointing device may be varied depending on positions of the input operation surface that his or her fingers or pointing device touches so that he or she can clearly identify the positions of input keys, allowing him or her to identify home positions for his or her index fingers (the positions of for example "J" key and "F" key). For example, as a user's finger approaches a home position, the amount of vibration is increased or the vibration frequency is shortened under the control of the controlling portion (not shown).

Alternatively, the input portion 62 may be a touch panel type (touch screen type) input apparatus that has a display portion such as an LCD at a lower portion of the touch sensor portion 64. In this case, the input operation surface displays a keyboard arrangement. The input portion 62 is used as a keyboard. When necessary, screens of different applications can be displayed on the display portion 61 and the input operation surface of the input portion 62, respectively. In addition, the foregoing input detecting function and force sense feedback function may be provided to the display portion 61.

Eighth Embodiment

In addition, the present invention can be applied to a system having a structure of which a user's input operation surface is separated from a detecting portion that detects whether the input operation surface has been touched. Next, an example of such a system will be described.

Figure 12:
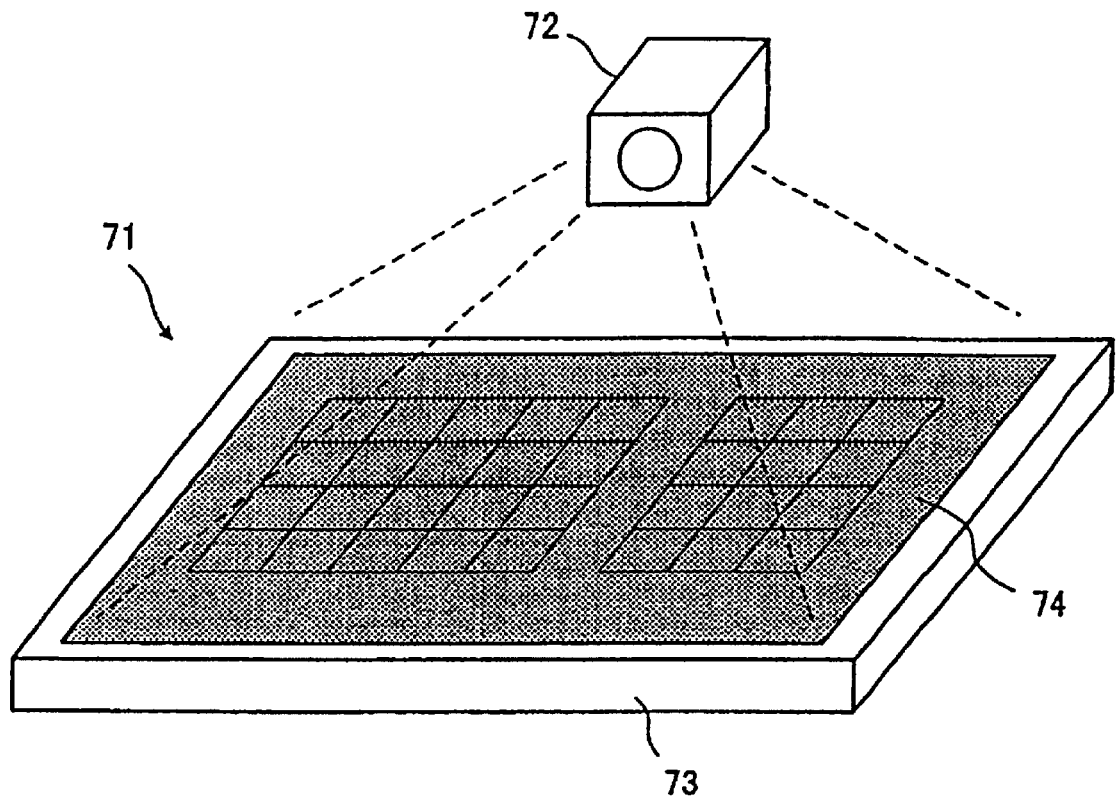
FIG. 12 is a schematic diagram showing an outlined structure of an input apparatus according to an eighth embodiment of the present invention.
Figure 13:
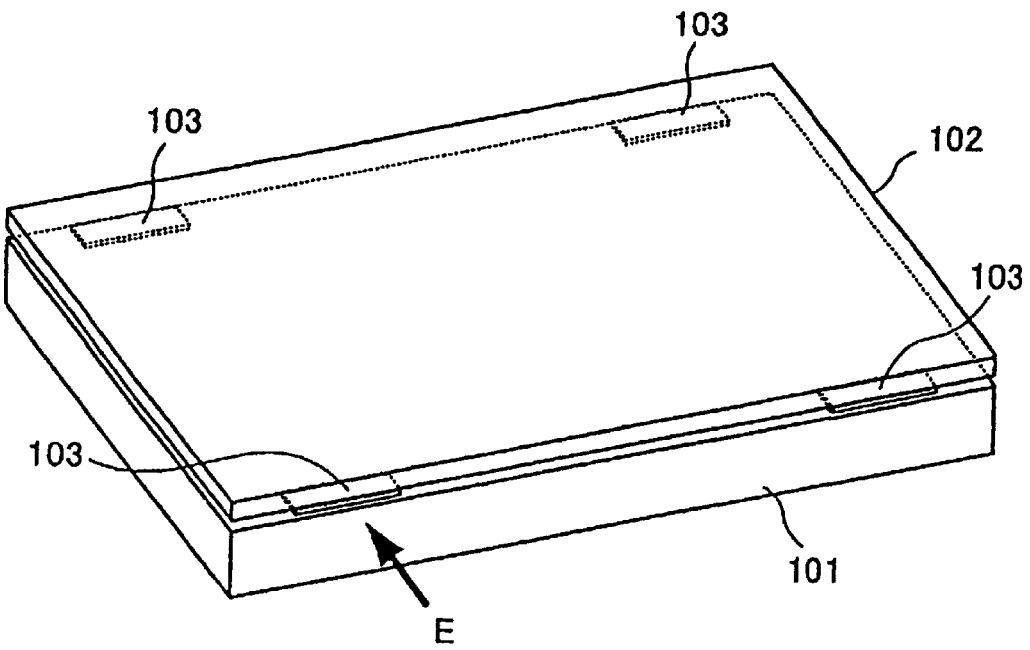
FIG. 13 is a perspective view showing an example of the structure of a touch panel type input apparatus having a force sense feedback function.
Figure 14:
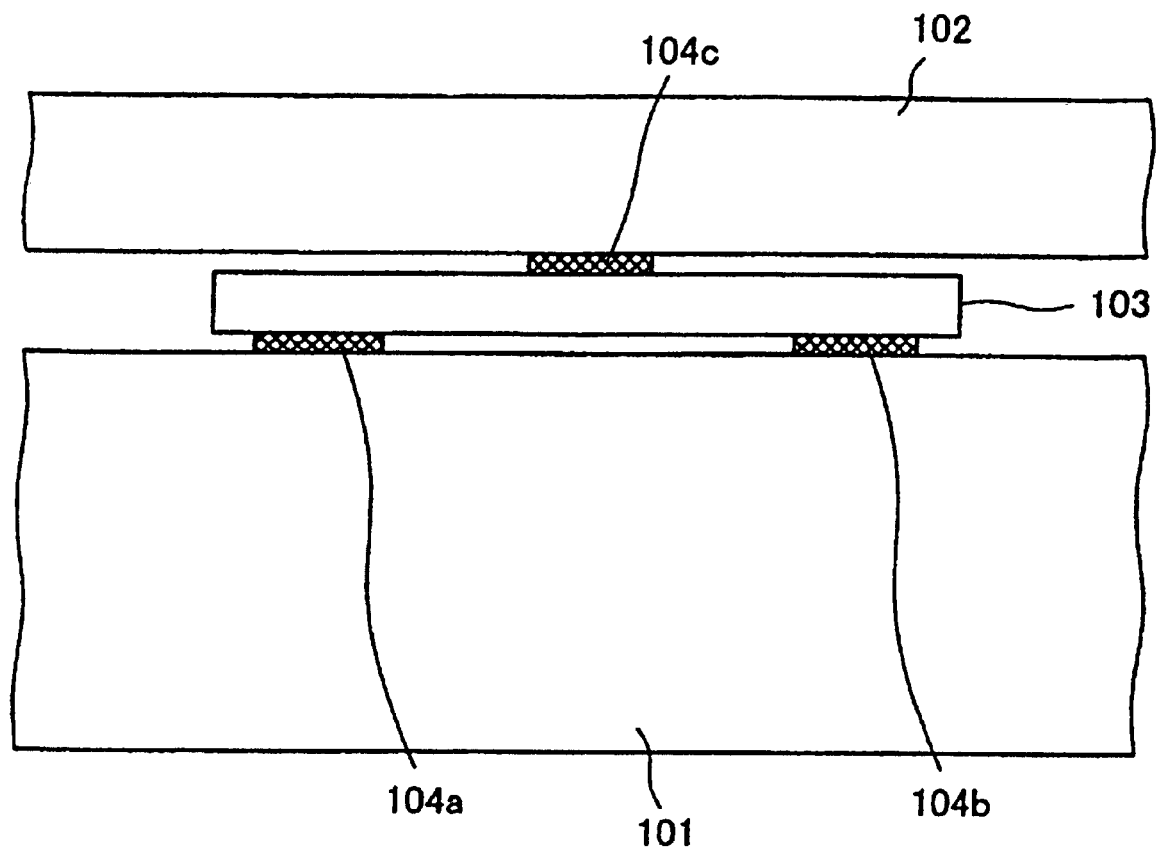
FIG. 14 is a sectional view showing a mounting structure of a conventional piezoelectric actuator.

FIG. 12 is a schematic diagram showing an outlined structure of an input apparatus according to an eighth embodiment of the present invention.

The input apparatus shown in FIG. 12 comprises a planar input portion 71 and an image sensor portion 72 that detects whether a user's input operation has been performed at what position. The input portion 71 comprises an outer casing 73 and a panel 74 whose upper surface is an input operation surface disposed in an opening portion of the outer casing 73. Piezoelectric actuators (not shown) are disposed in the outer casing 73. The piezoelectric actuators cause the panel 74 to move in the direction that a user's finger or a pointing device presses.

The image sensor portion 72 is disposed at a predetermined height from the input operation surface on the front side of the panel 74. The image sensor portion 72 may be integrated with the panel 74 or a member separated therefrom.

The image sensor portion 72 has an image pickup device such as CCDs (Charge-Coupled Devices) or a CMOS (Complementary Metal-Oxide Semiconductor) image sensor that has for example several thousand or several ten thousand pixels. The image sensor portion 72 photographs all the surface of the panel 74. A controlling circuit (not shown) performs an imaging process for extracting a contour with a photography signal so as to analyze the motion of user's fingers or a pointing device on the panel 74. Thus, it can be determined whether the panel 74 has been touched at what position. Alternatively, when home positions for user's index fingers are embossed or dented and the user performs a keyboard operation with reference to the home positions, the motion of the user's fingers can be more accurately analyzed than is done without the home positions. Alternatively, a sheet on which the keyboard arrangement is printed may be adhered on the panel 74 and the input position may be analyzed with reference to grid positions of the keyboard arrangement in addition to the motion of the fingers. With the home positions and keyboard arrangement that appear on the panel 74, a beginner of the keyboard operation can easily use the input apparatus.

Besides those, the image sensor portion 72 may comprise a light receiving portion that is a light emitting diode that emits light to the entire surface of the panel 74 and a light receiving portion that receives the reflected light from the panel 74. In this case, when a plurality of light receiving devices are arranged in a matrix shape in the light receiving portion, the controlling circuit can analyze whether the panel 74 has been touched by a finger or a pointing device at what position in accordance with the overall amount and distribution of received light.

In such an input apparatus, a function for a virtual keyboard and a function for a tablet device can be selectively used. In addition, such an input apparatus can be easily carried and used at any position apart from a display device and a controlling device. When it is detected that the panel 74 has been touched by a finger or a pointing device, the piezoelectric actuators are driven to move the panel 74. As a result, a force sense can be fed back to the user. Thus, the user's operational sense can be improved.

In the foregoing embodiments, input apparatuses having a function for detecting the position of a pressing portion or a touching portion were described. However, the present invention can be applied to an input apparatus that does not have a coordinate detecting function, but a function for detecting whether the apparatus was pressed or touched such as a button switch used to call an elevator cage and a button switch used to designate a floor that an elevator cage stops.

INDUSTRIAL UTILIZATION

As described above, the present invention can be applied to any input apparatus having an input operation surface that is driven by piezoelectric actuators to feed back a force sense to the user and an input apparatus that detects whether the input operation surface has been touched or pressed with a finger or a pointing device. As a result, an input apparatus that has a good operational sense and that is small and thin can be accomplished at low cost.

DESCRIPTION OF REFERENCE NUMERALS 2, 2A LIQUID CRYSTAL DISPLAY PORTION
2 TOUCH SENSOR PORTION
3 PIEZOELECTRIC ACTUATOR
4 FLEXIBLE BOARD
12, 22 FRAME
31 WIRING TERMINALS
41 MOUNTING PORTION
41a, 41b THROUGH-HOLE
41c CENTER SPACER PORTION
42 WIRING PATTERN
S401 PRODUCE FLEXIBLE BOARD.
S402 MOUNT PIEZOELECTRIC ACTUATOR.
S403 SOLDER WIRING TERMINALS.
S404 MOUNT FLEXIBLE BOARD ON FRAME OF LIQUID CRYSTAL DISPLAY PORTION.
S405 MOUNT TOUCH PANEL PORTION.
S701 PRODUCE FLEXIBLE BOARD.
S702 MOUNT PIEZOELECTRIC ACTUATOR.
S703 SOLDER TERMINALS OF BOTH ENDS OF PIEZOELECTRIC ACTUATOR.
S704 PULL OUT CENTER SPACER PORTION.
S705 MOUNT FLEXIBLE BOARD ON FRAME OF LIQUID CRYSTAL DISPLAY PORTION.
S706 MOUNT TOUCH SENSOR PORTION.

The invention claimed is:

1. An input apparatus for detecting that a front surface of a panel is pressed or touched and inputting data corresponding to the detected result, comprising:
a flexible wiring board on which a pattern of electrodes is formed and in which a pair of through-holes are formed so as to be aligned with each other; and
a piezoelectric actuator that includes a piezoelectric bi-morph device, the piezoelectric actuator including an upper surface and a lower surface on opposite sides of the piezoelectric actuator and being positioned on the flexible wiring board so as to bridge the pair of through-holes in the flexible wiring board such that end portions on the lower surface of the piezoelectric actuator contact the flexible wiring board at opposite ends of the piezoelectric actuator, a part of the flexible wiring board including a spacer portion that is located between the pair of through-holes and that is positioned on the upper surface of the piezoelectric actuator,
wherein the piezoelectric actuator is mounted on the flexible wiring board such that end portions of the upper surface of the piezoelectric actuator or a center portion of the lower surface of the piezoelectric actuator are positioned to contact the panel through an open portion of the flexible wiring board when the piezoelectric actuator is actuated.

2. The input apparatus as set forth in claim 1, wherein the flexible wiring board is disposed so that the spacer portion formed between the pair of through-holes contacts the panel.

3. The input apparatus as set forth in claim 1, wherein the flexible wiring board is disposed on the input apparatus so that the end portions on the lower surface of the piezoelectric actuator contact a first surface of the flexible wiring board, and a second surface of the flexible wiring board that is opposite the first surface of the flexible wiring board contacts the panel.

4. The input apparatus as set forth in claim 1, wherein the piezoelectric actuator includes wiring terminals disposed at a first end of the piezoelectric actuator, the wiring terminals being electrically connected to electrodes formed on the flexible wiring board.

5. The input apparatus as set forth in claim 4, wherein a resistor having a predetermined resistance is connected in parallel with the electrodes disposed on the flexible wiring board, the electrodes being connected to the wiring terminals of the piezoelectric actuator.

6. The input apparatus as set forth in claim 1, wherein the spacer portion formed between the pair of through-holes in the flexible wiring board is straightly cut therebetween.

7. The input apparatus as set forth in claim 6, wherein wiring terminals formed at a first end portion of the piezoelectric actuator and electrodes formed on the flexible wiring board are soldered and electrically connected.

8. The input apparatus as set forth in claim 7, wherein a second end portion of the piezoelectric actuator contacts the flexible wiring board, the second end portion of the piezoelectric actuator and the flexible wiring board being solder-fixed.

9. The input apparatus as set forth in claim 1, wherein a distance between outer end portions of the pair of through-holes is smaller than a length of the piezoelectric actuator in a longitudinal direction of the piezoelectric actuator, and a width of each of the pair of through-holes is larger than a width of the piezoelectric actuator.

10. The input apparatus as set forth in claim 1, further comprising:
a display portion configured to display a screen through the panel,
wherein when a front surface of the panel is pressed or touched, an operation function item displayed on the display portion is selectively input corresponding to a position that is pressed or touched on the front surface of the panel, and
wherein the piezoelectric actuator is disposed outside a display area of the display portion.

11. The input apparatus as set forth in claim 10, wherein the input apparatus includes a plurality of the piezoelectric actuators that are disposed around the display area of the display portion.

12. The input apparatus as set forth in claim 1, wherein the panel is a touch panel that is configured to selectively input an operation function item corresponding to a position that is touched, the panel having a display portion configured to display a screen through the touch panel and a holding portion that is disposed outside the display area of the display portion and that holds the display portion,
wherein when an operation function item displayed on the display screen of the display portion is touched, the operation function item corresponding to the position that is touched is selectively input, and
wherein the touch panel is moved in the vertical direction against the display surface of the display portion and the flexible wiring board is disposed between the touch panel and the holding portion.

13. The input apparatus as set forth in claim 12, wherein the input apparatus includes a plurality of the piezoelectric actuators that are disposed around the display area of the display portion.

14. A method for producing an input apparatus for detecting that a front surface of a panel is pressed or touched and inputting data corresponding to the detected result, the method comprising:
forming a pair of aligned through-holes in a flexible wiring board on which a pattern of electrodes is formed;
inserting a piezoelectric actuator that includes a piezoelectric bi-morph device into one of the pair of through-holes from a first side surface of the flexible wiring board and then inserting the piezoelectric actuator into the other of the pair of through-holes from a second side surface of the flexible wiring board that is on an opposite surface side of the flexible wiring board from the first side surface of the flexible wiring board so that opposite ends on a first surface of the piezoelectric actuator in a longitudinal direction of the piezoelectric actuator contact the same surface of the flexible wiring board; and mounting the flexible wiring board on the panel so that end portions of a second surface of the piezoelectric actuator located on an opposite side of the piezoelectric actuator from the first surface or a center portion of the first surface of the piezoelectric actuator contact the panel through an open portion of the flexible wiring board when the piezoelectric actuator is actuated.

15. A method for producing an input apparatus for detecting that the front surface of a panel is pressed or touched and inputting data corresponding to the detected result, the method comprising:

forming a pair of aligned through-holes aligned in a flexible wiring board on which a pattern of electrodes are formed and straightly cutting a part of the flexible wiring board that is located between the pair of through-holes;

mounting a piezoelectric actuator that includes a piezoelectric bi-morph device on the flexible wiring board so that the piezoelectric actuator bridges the pair of through-holes and soldering and electrically connecting wiring terminals formed at a first end portion of the piezoelectric actuator the electrodes formed on the flexible wiring board;

pulling out the part of the flexible wiring board that is located between the pair of through-holes in the flexible wiring board so that the part is positioned on an upper surface of the piezoelectric actuator; and mounting the flexible wiring board so that end portions of the upper surface of the piezoelectric actuator or a center portion of a lower surface of the piezoelectric actuator contact the panel through an open portion of the flexible wiring board when the piezoelectric actuator is actuated.

16. The method for producing the input apparatus as set forth in claim 15, wherein the mounting a piezoelectric actuator includes solder-fixing a second end portion of the piezoelectric actuator to a portion that the flexible wiring board that contacts the piezoelectric actuator.

17. A portable electronic apparatus having the input apparatus as set forth in claim 1.

* * * * *